(12) United States Patent
Kayama

(10) Patent No.: US 9,343,950 B2
(45) Date of Patent: May 17, 2016

(54) SEMICONDUCTOR INTEGRATED CIRCUIT AND OPERATION METHOD OF THE SAME

(71) Applicant: Renesas Electronics Corporation, Kawasaki-shi, Kanagawa (JP)

(72) Inventor: Masanori Kayama, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 373 days.

(21) Appl. No.: 14/077,262

(22) Filed: Nov. 12, 2013

(65) Prior Publication Data

US 2014/0145504 A1    May 29, 2014

(30) Foreign Application Priority Data

Nov. 28, 2012  (JP) .................................. 2012-259485

(51) Int. Cl.
| | |
|---|---|
| *G05F 3/06* | (2006.01) |
| *H02M 1/10* | (2006.01) |
| *H02J 7/00* | (2006.01) |
| *H02J 7/04* | (2006.01) |
| *H02M 1/32* | (2007.01) |
| *H02M 3/156* | (2006.01) |
| *H02J 5/00* | (2016.01) |
| *H02J 7/02* | (2016.01) |
| *H02J 17/00* | (2006.01) |
| *H02M 3/158* | (2006.01) |
| *H02M 1/00* | (2006.01) |

(52) U.S. Cl.
CPC ............... *H02M 1/10* (2013.01); *H02J 7/0055* (2013.01); *H02J 7/045* (2013.01); *H02M 1/32* (2013.01); *H02M 3/156* (2013.01); *H02J 5/005* (2013.01); *H02J 7/025* (2013.01); *H02J 17/00* (2013.01); *H02J 2007/0062* (2013.01); *H02M 3/1588* (2013.01); *H02M 2001/0045* (2013.01); *Y02B 40/90* (2013.01); *Y02B 70/1466* (2013.01); *Y10T 307/344* (2015.04)

(58) Field of Classification Search
CPC ......... H02M 1/10; H02M 1/32; H02M 3/156; H02J 7/0055; H02J 7/045
See application file for complete search history.

(56) References Cited

U.S. PATENT DOCUMENTS

| 2010/0311327 A1 | 12/2010 | Hamada |
| 2011/0156659 A1 | 6/2011 | Saeki et al. |

(Continued)

FOREIGN PATENT DOCUMENTS

| JP | 2000-228833 A | 8/2000 |
| JP | 2009-253649 A | 10/2009 |
| JP | 2011-155830 A | 8/2011 |

*Primary Examiner* — Daniel Cavallari
(74) *Attorney, Agent, or Firm* — Shapiro, Gabor and Rosenberger, PLLC

(57) ABSTRACT

The present invention is to reduce the possibility that a DC-DC converter stops in the case where supply power is small and load current is large. Output terminals use a DC output voltage of a DC-DC converter so that an external battery can be charged or power can be supplied to a power-reception-side system on the outside, and a current limiting circuit limits load current of a power supply switch transistor flowing from a converter output terminal to the output terminals. An input voltage detecting circuit detects level of a DC input voltage of an input terminal, generates a detection signal, and supplies the detection signal to the current limiting circuit. In the case where the DC input voltage of the input terminal is at the low level, the current limiting circuit controls the maximum current by current limitation of the power supply switch transistor to a small current.

20 Claims, 11 Drawing Sheets

(56) References Cited

U.S. PATENT DOCUMENTS

2013/0307917 A1* 11/2013 Hayasaki ............ H02M 3/3381
 347/247

2015/0288294 A1* 10/2015 So ..................... H02M 3/33507
 363/89

* cited by examiner

FIG. 3

| TERMINAL NAME | TERMINAL FUNCTION | TERMINAL NAME | TERMINAL FUNCTION |
|---|---|---|---|
| INPUT VOLTAGE 1 | POWER SUPPLY INPUT TERMINAL BY WIRELESS POWER TRANSMISSION OR AC POWER SUPPLY INTERFACE | DDOUT1 | DCDC CONVERTER OUTPUT (SWITCHING OUTPUT) |
| INPUT VOLTAGE 2 | POWER SUPPLY INPUT TERMINAL BY USB POWER SUPPLY | DDOUT2 | DCDC CONVERTER OUTPUT (AFTER PASSAGE OF LOW-PASS FILTER) |
| D+ | SUPPLY OF NON-INVERSION INPUT SIGNAL OF USB DIFFERENTIAL DATA | SYS | POWER OUTPUT TO POWER-RECEPTION-SIDE SYSTEM 3 |
| D- | SUPPLY OF INVERSION INPUT SIGNAL OF USB DIFFERENTIAL DATA | BAT | COUPLING TERMINAL OF SECONDARY CELL 26 |
| CLOCK | CLOCK TERMINAL OF EXTERNAL INTERFACE | VDD18 | 1.8 V POWER SUPPLY OUTPUT (SUPPLY TO MCU) |
| SERIAL DATA | SERIAL INPUT/OUTPUT TERMINAL OF EXTERNAL INTERFACE | VDD30 | 3.0 V POWER SUPPLY OUTPUT (SUPPLY TO MCU) |

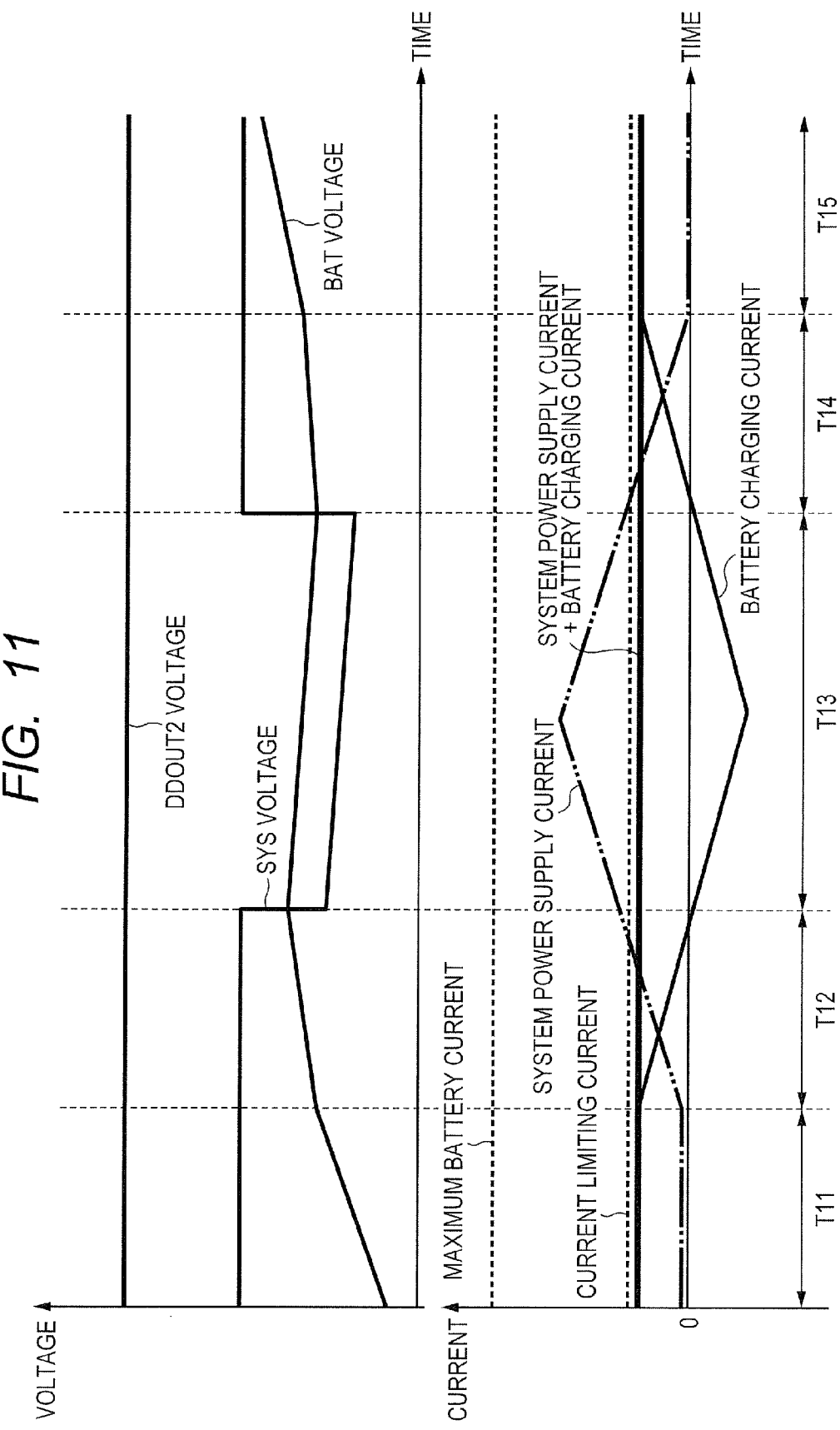

SEMICONDUCTOR INTEGRATED CIRCUIT AND OPERATION METHOD OF THE SAME

CROSS-REFERENCE TO RELATED APPLICATIONS

The disclosure of Japanese Patent Application No. 2012-259485 filed on Nov. 28, 2012 including the specification, drawings and abstract is incorporated herein by reference in its entirety.

BACKGROUND

The present invention relates to a semiconductor integrated circuit and an operation method of the same and, more particularly, to a technique effective to reduce the possibility that a DC-DC converter stops in the case where supply power is small and load current such as charging current of a secondary cell (battery) is large.

Conventionally, a semiconductor integrated circuit and an antenna coil are mounted on an IC card, and power supply of the IC card is performed by receiving an RF signal from a reading/writing device called a card reader/card writer by the antenna coil and rectifying it by a rectifier circuit. An IC card having no power supply as described above is spread in an automatic ticket gate system, electronic money, logistics, and the like. The RF power supply is performed to the IC card, and unique identification information (ID information) is stored in a built-in nonvolatile memory, so that the IC card is called an RFID card. An IC card used in the fields of an automatic ticket gate system, electronic money, and the like uses NFC (Near Field Communication) using an RF frequency of 13.56 MHz.

On the other hand, a wireless power supply system called "wireless charger" capable of charging a portable device such as a smart phone which is just put on a dedicated charging table without coupling a power cable to the portable device is being spread. The wireless power supply system is provided to address draining of the battery of a cellular phone called a smartphone. That is, a smartphone is a multifunctional cellular phone having an affinity for the Internet and whose base is the function of a personal computer or a multifunctional cellular phone obtained by adding the PDA function to a telephone and mail function. A wireless power supply system is based on the international standard called "Qi" developed by Wireless Power Consortium (WPC) as an industry organization. By providing each of a transmission-side device and a reception-side device with a coil, power can be supplied from the transmission-side device to the reception-side device by the electromagnetic induction method. The advantages of the wireless power supply system are that it is unnecessary to insert and remove a power connector for charging and, particularly, a work of opening/closing a cover of a power supply connector of a portable device can be omitted.

On the other hand, it is written in FIG. 2 of the following patent literature 1 and disclosure related to it that NFC is performed between a port device and a mobile device and non-contact power transmission for charging a secondary cell (battery) of the mobile device is performed from the port device. The mobile device has an induction coil for NFC and an induction coil for charging, the induction coil for NFC is coupled to an NFC chip, and the induction coil for charging is coupled to a power receiver for charging, a charge controller, and a secondary cell. The port device has an induction coil for NFC and an induction coil for charging, the induction coil for NFC is coupled to an NFC chip, and the induction coil for charging is coupled to a power supply unit for charging.

It is written in FIG. 3 of the patent literature 1 and disclosure related to it that an operation timing of the NFC between a port device and a mobile device and an operation timing of non-contact power transmission for charging a secondary cell (battery) of the mobile device from the port device are repeated in a time division manner. Since the non-contact power transmission for charging is not performed at the operation timing of the NFC by the time division, it is presumed that deterioration in the signal quality such as noise from the non-contact power transmission to the NFC can be lessened.

Further, another non-contact power transmission method is written in FIG. 7 of the patent literature 1 and disclosure related to it that NFC is performed between a port device and a mobile device and a secondary cell (battery) of the mobile device is charged from the port device. The mobile device has one induction coil used for both NFC and charging, the one induction coil is coupled to a circuit selector, and the circuit selector is coupled to an NFC chip and a power receiver for charging. The circuit selector selects arbitrary one of the NFC chip and the power receiver for charging, and the selected one is coupled to the single induction coil via the circuit selector. The port device has one induction coil used for both NFC and charging, the one induction coil is coupled to a circuit selector, and the circuit selector is coupled to an NFC chip and a power supply unit for charging. The circuit selector selects arbitrary one of the NFC chip and the power supply unit for charging, and the selected one is coupled to the single induction coil via the circuit selector.

Further, the following patent literature 2 discloses that, in an electronic device for charging a battery by being selectively coupled to power supplies of two or more kinds, a controller is used which performs prompt coupling to another power supply to start charging of the battery when coupling to the power supply from which power is supplied is cancelled. Specifically, the control by the controller is performed in such a manner that the battery is charged by an AC power supply when current is supplied from the AC power supply to an AC coupling unit, and the battery is charged by a power supply of an external device when current is not supplied from the AC power supply to the AC coupling unit but current is supplied from an external device to an external device coupling unit. In particular, when the external device coupling unit is coupled to an external device during the battery is charged by the AC power supply, the controller performs initial communication with the external device and makes a charging setting necessary to charge the battery via the external device. The external device coupling unit is concretely a USB coupling unit, and an interface of another standard such as IEEE1394 can be also employed. In the case where the electronic device is coupled to both the AC power supply and the external device, current from the AC power supply is larger than that from the external device, so that the controller charges the battery by the AC power supply.

Further, the following patent literature 3 discloses that, to save power of a power supply of an electronic device and simplify control of a power supply circuit and the like, a control unit of a DC-DC converter which supplies operation power for a system device and a charging power for a battery controls so that the sum of the operation power for the system device and the charging power for the battery is almost constant. The system device includes a CPU, a hard disk drive, a CD-ROM drive, a display unit, and the like.

BACKGROUND ART LITERATURE

Patent Literature

Patent Literature 1: Japanese Unexamined Patent Publication No. 2009-253649

Patent Literature 2: Japanese Unexamined Patent Publication No. 2011-155830

Patent Literature 3: Japanese Unexamined Patent Publication No. 2000-228833

SUMMARY

Prior to the present invention, the inventors of the present invention were engaged in development of a wireless, that is, non-contact charging method for a secondary cell to be mounted on a portable communication device such as a smartphone.

In the development, first, the inventors examined portable communication devices and charging methods in the past.

Also in a cellular phone before a smartphone, an antenna coil and an NFC chip for NFC are mounted to realize application functions of an automatic ticket gate system, electronic money, and the like using an IC card performing NFC. Therefore, also in a cellular phone of a smartphone, by following a method of a preceding cellular phone, an antenna coil and an NFC chip for NFC are mounted. However, power of NFC in the conventional technique is a power which makes the antenna coil and the NFC chip operate and does not have a remaining power to charge a secondary cell (battery) mounted on a cellular phone.

On the other hand the Qi standard developed by WPC as an industry organization uses the frequency of 100 KHz to 200 KHz considerably lower than the RF frequency of 13.56 MHz of the NFC. Therefore, to apply the secondary cell (battery) charging method complied with a wireless power supply system according to the Qi standard to a cellular phone such as a smartphone, an antenna receiving a low frequency of the Qi standard has to be provided for the cellular phone in addition to a conventional antenna coil for NFC. As a result, two kinds of antennas have to be mounted in a cellular phone such as a smartphone, and the problem that it is difficult to assure a mounting space was made clear by the examination performed by the inventors of the present invention prior to the present invention. To solve the problem, in the development performed by the inventors of the present invention prior to the present invention, as described in FIG. 7 of the patent literature 7 and the disclosure related to it, the method of using one induction coil which is used for both NFC and charging in a mobile device is employed.

Further, in the development performed by the inventors of the present invention prior to the present invention, it is required to charge a secondary cell (battery) of a portable electronic device such as a smartphone from a plurality of power supply voltages such as an AC-DC power supply voltage generated by rectifying and smoothing an AC power supply voltage from an AC power supply, a USB power supply voltage from a USB coupling, and a power supply voltage by wireless power supply of the above-described wireless power supply system. Further, it is also necessary to generate an almost constant DC voltage from various power supply voltage levels of a plurality of power supply voltages, and the almost constant DC voltage is used to generate an operation voltage to an internal electronic circuit in a portable electronic device such as a smartphone and to generate charging of a secondary cell (battery). Therefore, it was determined to employ a high-efficiency DC-DC converter to generate an almost constant DC voltage in the development by the inventors of the present invention prior to the present invention. However, in the case where the power supplied from a transmission-side system to a reception-side system by wireless power supply of a wireless power supply system is smaller than power consumed on a reception system side, for example, in the case where charging current for a secondary cell (battery which is pre-set on the reception system side is larger than supply power by the wireless power supply, the reception system side tries to perform battery charging operation with the set charging current amount. However, since the supply power of the wireless power supply is insufficient, the power supply voltage of the DC-DC converter drops, and the DC-DC converter stops. Therefore, a problem such that when the DC-DC converter stops, the battery cannot be charged was made clear by the examination of the inventors of the present invention performed prior to the present invention.

Means and the like for solving such a problem will be described hereinafter. The other problems and novel features will become apparent from the description of the specification and the attached drawings.

Outline of a representative embodiment disclosed in the present invention will be briefly described as follows.

A semiconductor integrated circuit (212) as a representative embodiment includes an input terminal (T1), a DC-DC converter (2121), output terminals (T3 and T4), a power supply switch transistor (Path_SW), a current limiting circuit (21241), and an input voltage detecting circuit (21242).

A DC input voltage ($V_{IN}$) generated by rectifying and smoothing an RF reception signal can be supplied to the input terminal (T1).

The DC-DC converter (2121) generates, from a converter output terminal (T6), a DC output voltage ($V_{DDOUT2}$) having a desired voltage level from the DC input voltage ($V_{IN}$) supplied to the input terminal (T1).

The output terminals (T3 and T4) can charge an external battery (26) or supply power to an external power-reception-side system (3) by using the DC output voltage ($V_{DDOUT2}$).

The power supply switch transistor (Path_SW) enables electric conduction between the output terminals (T3 and T4) and the converter output terminal (T6) of the DC-DC converter (2121).

The current limiting circuit (21241) limits a load current of the power supply switch transistor (Path_SW) flowing from the converter output terminal (T6) to the output terminals (T3 and T4).

The input voltage detecting circuit (21242) generates an input voltage detection signal ($V_{IN\_DIV}$) according to detection of the level of the DC input voltage ($V_{IN}$) supplied to the input terminal (T1) and supplies the input voltage detection signal ($V_{IN\_DIV}$) to the current limiting circuit (21241).

The current limiting circuit (21241) controls the value of maximum current (I_limit) by the current limit of the power supply switch transistor (Path_SW) in response to the input voltage detection signal ($V_{IN\_DIV}$).

In the case where the DC input voltage ($V_{IN}$) supplied to the input terminal (T1) is at the low level, the current limiting circuit (21241) controls the maximum current (I_limit) by the current limit of the power supply switch transistor (Path_SW) to small current (refer to FIG. 5).

An effect obtained by the representative one of the embodiments disclosed in the present invention will be briefly described as follows.

By the semiconductor integrated circuit (212), the possibility that the DC-DC converter stops in the case where supply power is small and load current is large can be lessened.

BRIEF DESCRIPTION OF THE DRAWINGS

FIG. 3 is a diagram illustrating the functions of external terminals of the semiconductor integrated circuit for battery charging control according to the first embodiment shown in FIG. 2.

FIG. 11 is a diagram illustrating the operation of the semiconductor integrated circuit in the case of setting a maximum battery current which is adjusted by a resistor to be higher than a current limiting current of a P-channel MOS transistor of a switch in a state where the DC power supply voltage at intermediate level or high level is supplied to the supply terminal by wireless power supply.

DETAILED DESCRIPTION

1. Outline of Embodiments

Figure 1:
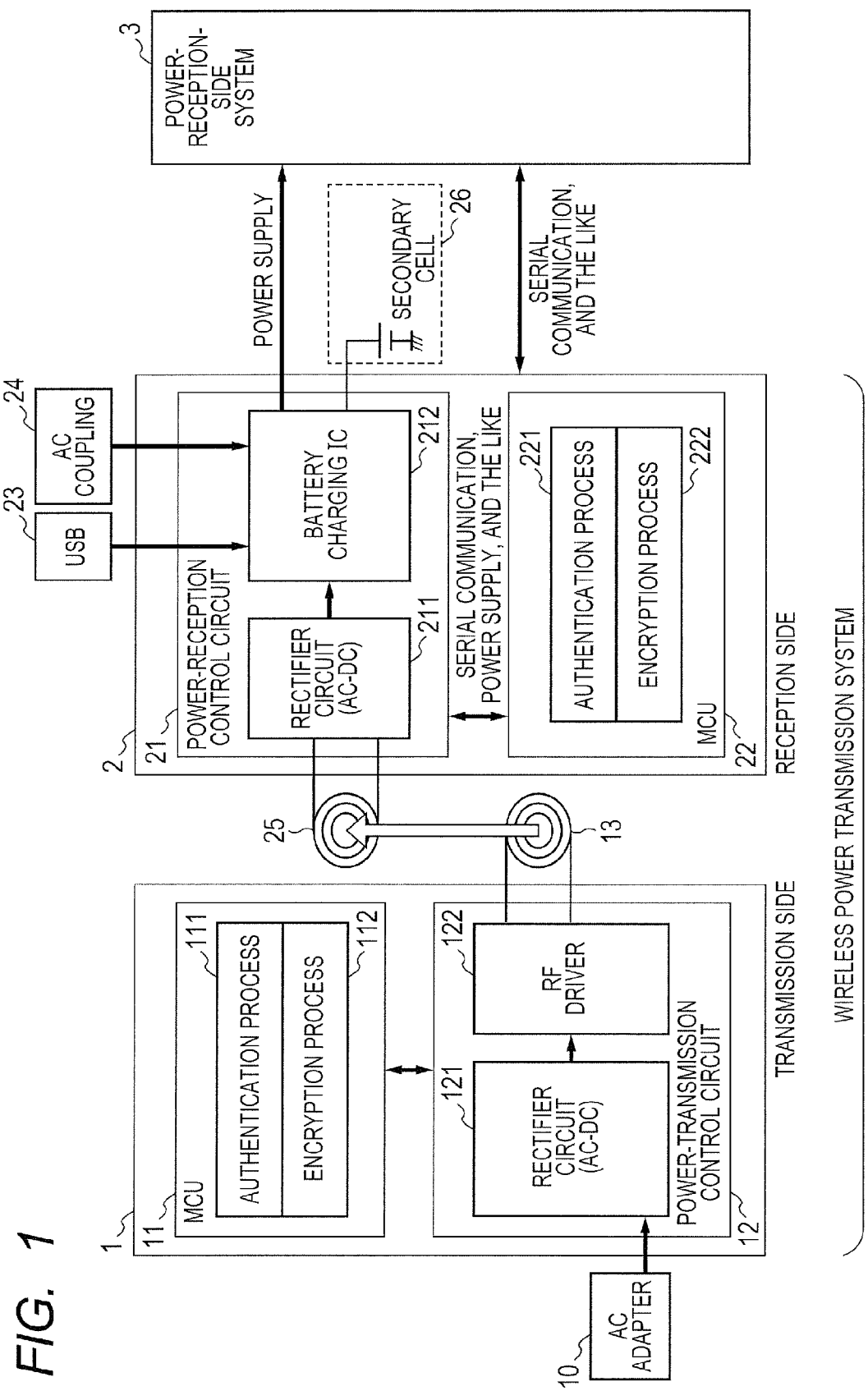
FIG. 1 is a diagram illustrating the configuration of a wireless power transmission system for a multifunctional cellular phone including a semiconductor integrated circuit executing battery charging control operation in a first embodiment.

First, representative embodiments disclosed in the application will be described. Reference numerals in the drawings referred to in parentheses in the description of the outline of the representative embodiments merely illustrate components designated with the reference numerals included in the concept of the components.

[1] A semiconductor integrated circuit (212) as a representative embodiment includes an input terminal (T1), a DC-DC converter (2121), output terminals (T3 and T4), a power supply switch transistor (Path_SW), a current limiting circuit (21241), and an input voltage detecting circuit (21242).

A DC input voltage ($V_{IN}$) generated by rectifying and smoothing an RF reception signal can be supplied to the input terminal (T1).

The DC-DC converter (2121) can generate, from a converter output terminal (T6), a DC output voltage ($V_{DDOUT2}$) having a desired voltage level from the DC input voltage ($V_{IN}$) supplied to the input terminal (T1).

The output terminals (T3 and T4) can charge an external battery (26) or supply power to an external power-reception-side system (3) by using the DC output voltage ($V_{DDOUT2}$).

The power supply switch transistor (Path_SW) enables electric conduction between the output terminals (T3 and T4) and the converter output terminal (T6) of the DC-DC converter (2121).

The current limiting circuit (21241) limits a load current of the power supply switch transistor (Path_SW) flowing from the converter output terminal (T6) to the output terminals (T3 and T4).

The input voltage detecting circuit (21242) generates an input voltage detection signal ($V_{IN\_DIV}$) according to detection of the level of the DC input voltage ($V_{IN}$) supplied to the input terminal (T1) and supplies the input voltage detection signal ($V_{IN\_DIV}$) to the current limiting circuit (21241).

The current limiting circuit (21241) controls the value of maximum current (I_limit) by the current limit of the power supply switch transistor (Path_SW) in response to the input voltage detection signal ($V_{IN\_DIV}$) supplied from the input voltage detecting circuit (21242).

In the case where the DC input voltage ($V_{IN}$) supplied to the input terminal (T1) is at the high level, the current limiting circuit (21241) controls the value of the maximum current (I_limit) by the current limit of the power supply switch transistor (Path_SW) to large current in response to the input voltage detection signal ($V_{IN\_DIV}$).

Figure 5:
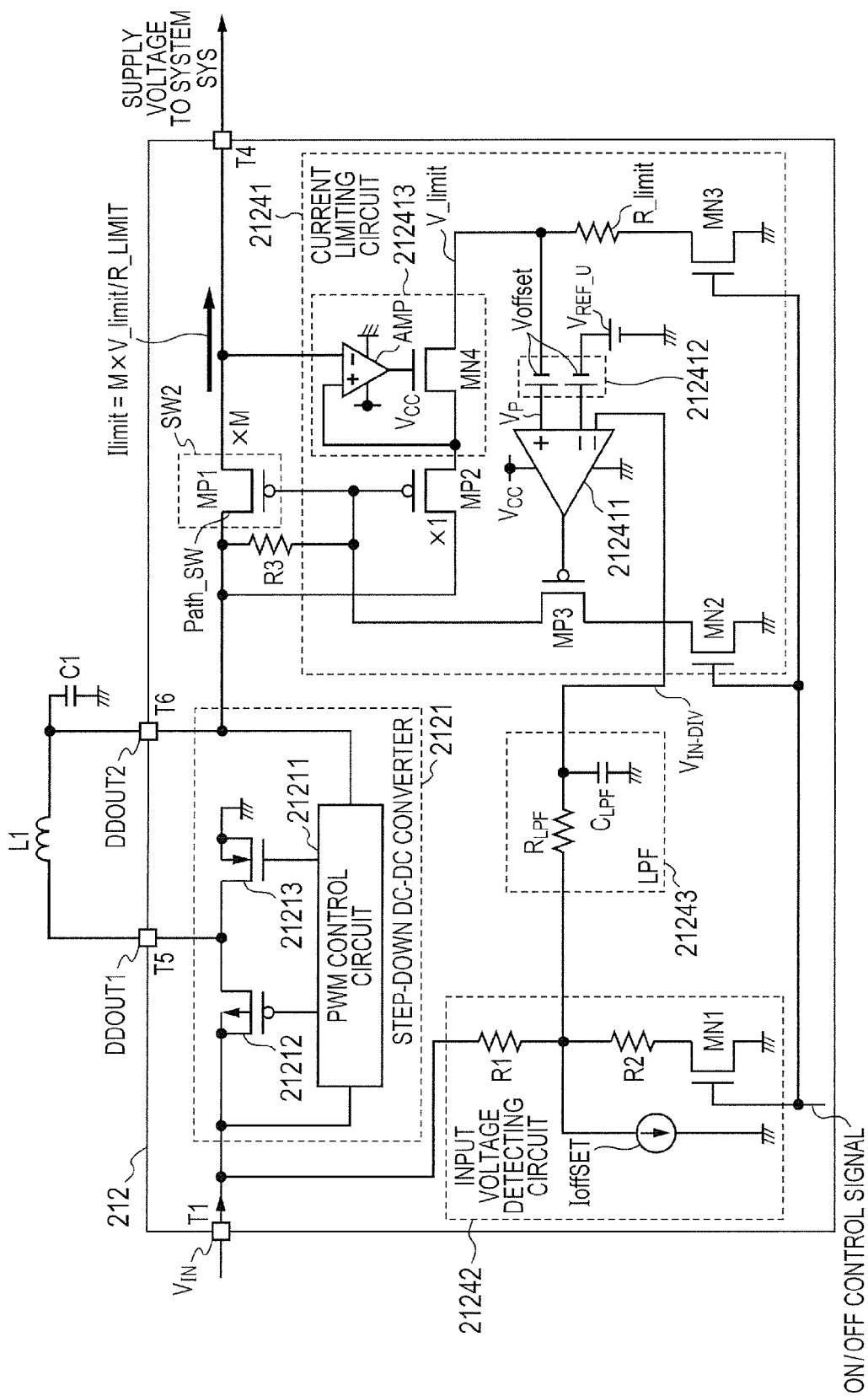
FIG. 5 is a diagram illustrating a detailed configuration for power supply to the power-reception-side system and charging of the secondary cell, of the semiconductor integrated circuit for battery charging control according to the first embodiment shown in FIG. 4.

In the case where the DC input voltage ($V_{IN}$) supplied to the input terminal (T1) is at a level lower than the high level, the current limiting circuit (21241) controls the value of the maximum current (I_limit) by the current limit of the power supply switch transistor (Path_SW) to current smaller than the large current in response to the input voltage detection signal ($V_{IN\_DIV}$) (refer to FIG. 5).

According to the embodiment, the possibility that the DC-DC converter stops in the case where the supply power is large and the load current is large can be lessened.

In a preferred embodiment, the power supply switch transistor (Path_SW) is a P-channel MOS transistor (MP1) whose source and drain are coupled to the converter output terminal (T6) and the output terminals (T3 and T4), respectively (refer to FIG. 5).

In another preferred embodiment, the gate of the P-channel MOS transistor (MP1) of the power supply switch transistor (Path_SW) is controlled by the current limiting circuit (21241) (refer to FIG. 5).

In further another preferred embodiment, the current limiting circuit (21241) includes a control P-channel MOS transistor (MP2), a detection resistor (R_limit), and a differential amplifier (212411).

The source and drain of the control P-channel MOS transistor (MP2) are coupled to the converter output terminal (T6) and one end of the detection resistor (R_limit), respectively, and the other end of the detection resistor (R_limit) is coupled to grounding potential.

A reference voltage ($V_{REF\_U}$), the input voltage detection signal ($V_{IN\_DIV}$), and a detection voltage (V_limit) of the one end of the detection resistor (R_limit) are supplied to a first inversion input terminal (−), a second inversion input terminal (−), and a non-inversion input terminal (+) of the differential amplifier (212411), respectively.

The gate of the P-channel MOS transistor (MP1) and a gate of the control P-channel MOS transistor (MP2) are controlled by an output signal of the differential amplifier (212411).

The differential amplifier selects a low voltage level from the reference voltage of the first inversion input terminal and the input voltage detection signal of the second inversion input terminal, and the output signal of the differential amplifier controls drain current of the control P-channel MOS transistor (MP2) so that the detection voltage of a non-inversion input terminal matches the selected low voltage level (refer to FIG. 5).

In a more preferable embodiment, in the case where level of the reference voltage of the first inversion input terminal (−) is lower than that of the input voltage detection signal ($V_{IN\_DIV}$) of the second inversion input terminal (−), drain current of the control P-channel MOS transistor (MP2) is controlled so that the detection voltage (V_limit) matches the reference voltage ($V_{REF\_U}$).

In the case where the level of the input voltage detection signal ($V_{IN\_DIV}$) of the second inversion input terminal (−) is lower than that of the reference voltage ($V_{REF\_U}$) of the first inversion input terminal (−), the drain current of the control P-channel MOS transistor (MP2) is controlled so that the detection voltage (V_limit) matches the input voltage detection signal ($V_{IN\_DIV}$) (refer to FIG. 5).

In another more preferable embodiment, the current limiting circuit (21241) further includes an offset voltage circuit (212412) for generating a first offset voltage (Voffset) and a second offset voltage (Voffset).

A first sum voltage of the first offset voltage (Voffset) and the detection voltage (V_limit) is supplied to the non-inversion input terminal (+) of the differential amplifier (212411), and a second sum voltage of the second offset voltage (Voffset) and the reference voltage ($V_{REF\_U}$) is supplied to the first inversion input terminal (−) of the differential amplifier (212411) (refer to FIG. 5).

In further another more preferable embodiment, the current limiting circuit (21241) further includes a voltage control circuit (212413) having a voltage comparison amplifier (AMP) and a comparison control transistor (MN4).

The first and second input terminals of the voltage comparison amplifier (AMP) are coupled to the drain of the P-channel MOS transistor (MP1) of the power supply switch transistor (Path_SW) and the drain of the control P-channel MOS transistor (MP2), respectively.

An output terminal of the voltage comparison amplifier (AMP) is coupled to a control input terminal of the comparison control transistor (MN4), and an output current path of the comparison control transistor (MN4) is coupled between the drain of the control P-channel MOS transistor (MP2) and the one end of the detection resistor (R_limit) (refer to FIG. 5).

In further another more preferable embodiment, the input voltage detection circuit (21242) includes a first voltage dividing resistor (R1) and a second voltage dividing resistor (R2).

The DC input voltage ($V_{IN}$) to be supplied to the input terminal (T1) is supplied to one end of the first voltage dividing resistor (R1), the other end of the first voltage dividing resistor (R1) is coupled to one end of the second voltage dividing resistor (R2), the other end of the second voltage dividing resistor (R2) is coupled to grounding potential.

The input voltage detection signal ($V_{IN\_DIV}$) is generated from a coupling node between the other end of the first voltage dividing resistor (R1) of the input voltage detection circuit (21242) and the one end of the second voltage dividing resistor (R2) (refer to FIG. 5).

The semiconductor integrated circuit (212) according to the further another more preferable embodiment further includes a low-pass filter (21243) including a resistive element ($R_{LPF}$) and a capacitive element ($C_{LPF}$).

The input voltage detection signal generated from the input voltage detection circuit (21242) is supplied to an input terminal of the low-pass filter (21243), and the input voltage detection signal transmitted to the output terminal of the low-pass filter (21243) is supplied to the second inversion input terminal (−) of the current limiting circuit (21241) (refer to FIG. 5).

Figure 2:
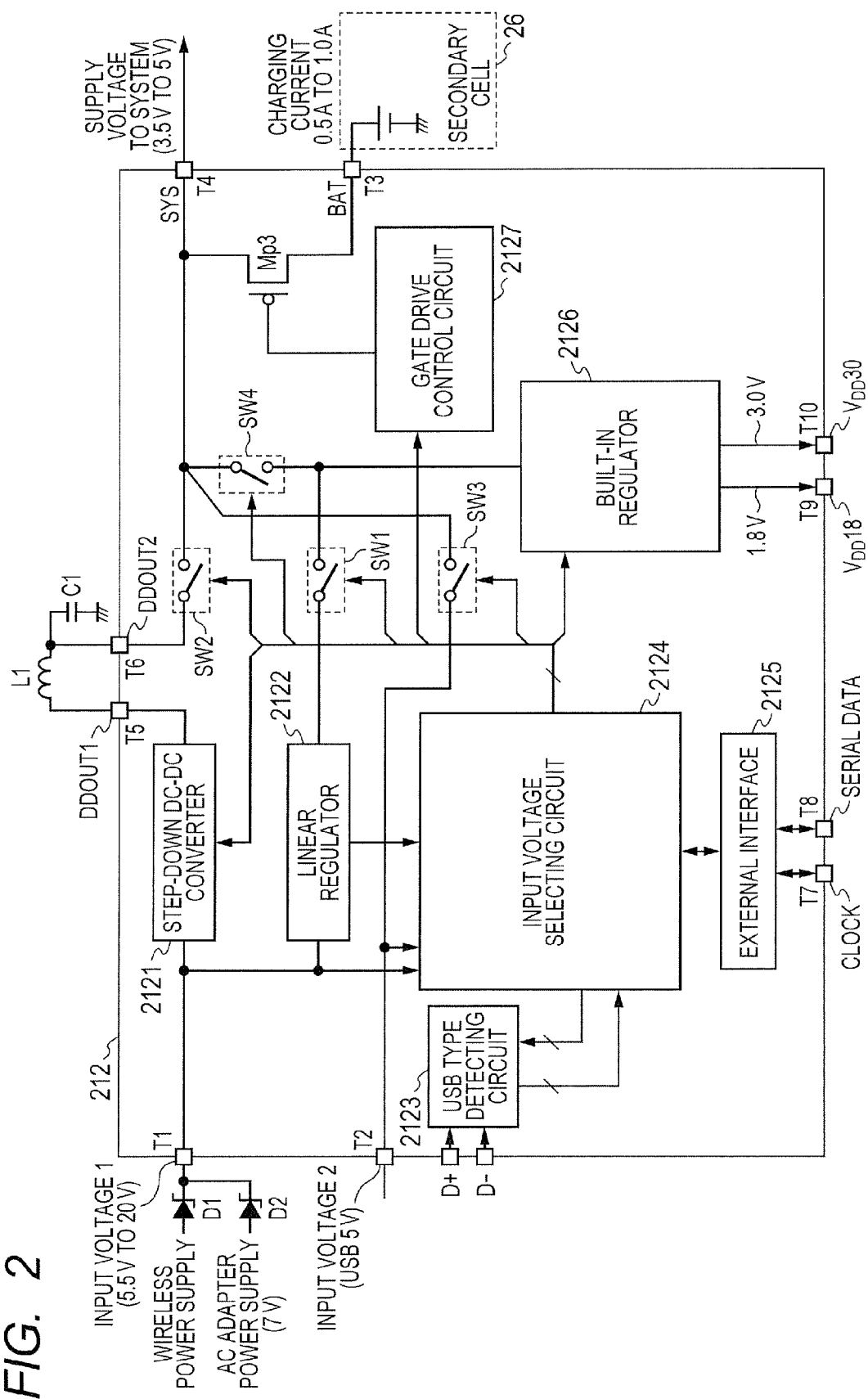
FIG. 2 is a diagram illustrating the configuration of the semiconductor integrated circuit for battery charging control according to the first embodiment shown in FIG. 1.

In a concrete embodiment, an RF signal by NFC and an RF signal by wireless power supply can be supplied in a time division manner to the input terminal (T1) (refer to FIGS. 1 and 2).

In another concrete embodiment, the semiconductor integrated circuit (212) further includes a linear regulator (2122) coupled in parallel to the DC-DC converter (2121) coupled between the input terminal (T1) and the output terminals (T3 and T4).

The linear regulator (2122) promptly operates in response to supply of the DC input voltage ($V_{IN}$) of the input terminal (T1).

The DC-DC converter (2121) operates as a switching regulator having power efficiency higher than that of the linear regulator (2122) (refer to FIG. 2).

In a more concrete embodiment, the input terminal (T1) is configured so that the DC input voltage ($V_{IN}$) can be supplied to the input terminal (T1) via a first schottky diode (D1) and an AC-DC conversion voltage of an AC power supply coupling interface (24) can be supplied to the input terminal (T1) via a second schottky diode (D2) (refer to FIG. 2).

In a most concrete embodiment, the semiconductor integrated circuit (212) further includes another input terminal (T2) and a switch (SW3).

The another input terminal (T2) is configured so that a USB power supply voltage of a USB coupling interface (23) can be supplied to the another input terminal (T2).

The one end and the other end of the switch (SW3) are coupled to the another input terminal (T2) and the output terminals (T3, T4), respectively (refer to FIG. 2).

[2] A representative embodiment of another aspect relates to an operation method of a semiconductor integrated circuit (212) having an input terminal (T1), a DC-DC converter (2121), output terminals (T3 and T4), a power supply switch transistor (Path_SW), a current limiting circuit (21241), and an input voltage detecting circuit (21242).

A DC input voltage ($V_{IN}$) generated by rectifying and smoothing an RF reception signal can be supplied to the input terminal (T1).

The DC-DC converter (2121) can generate, from a converter output terminal (T6), a DC output voltage ($V_{DDOUT2}$) having a desired voltage level from the DC input voltage ($V_{IN}$) supplied to the input terminal (T1).

The output terminal (T3, T4) can charge an external battery (26) or supply power to an external power-reception-side system (3) by using the DC output voltage ($V_{DDOUT2}$).

The power supply switch transistor (Path_SW) enables electric conduction between the output terminal (T3, T4) and the converter output terminal (T6) of the DC-DC converter (2121).

The current limiting circuit (21241) limits a load current of the power supply switch transistor (Path_SW) flowing from the converter output terminal (T6) to the output terminal (T3, T4).

The input voltage detecting circuit (21242) generates an input voltage detection signal ($V_{IN\_DIV}$) according to detection of the level of the DC input voltage ($V_{IN}$) supplied to the input terminal (T1) and supplies the input voltage detection signal ($V_{IN\_DIV}$) to the current limiting circuit (21241).

The current limiting circuit (21241) controls the value of maximum current (I_limit) by the current limit of the power supply switch transistor (Path_SW) in response to the input voltage detection signal ($V_{IN\_DIV}$) supplied from the input voltage detection circuit (21242).

In the case where the DC input voltage ($V_{IN}$) supplied to the input terminal (T1) is at the high level, the current limiting circuit (21241) controls the value of the maximum current (I_limit) by the current limit of the power supply switch transistor (Path_SW) to large current in response to the input voltage detection signal ($V_{IN\_DIV}$).

In the case where the DC input voltage ($V_{IN}$) supplied to the input terminal ($T_1$) is at a level lower than the high level, the current limiting circuit (21241) controls the value of maximum current (I_limit) by the current limit of the power supply switch transistor (Path_SW) to a current smaller than the large current in response to the input voltage detection signal ($V_{IN\_DIV}$) (refer to FIG. 5).

According to the embodiment, the possibility that the DC-DC converter stops in the case where the supply power is small and the load current is large can be lessened.

2. Details of Embodiments

Next, embodiments will be described more specifically. In all of the diagrams for explaining the best mode for carrying out the invention, the same reference numerals are designated to parts having the same functions as those in the above-described drawings, and their description will not be repeated.

First Embodiment
Configuration of Wireless Power Transmission System for Multifunctional Cellular Phone FIG. 1 is a diagram illustrating the configuration of a wireless power transmission system for a multifunctional cellular phone having a semiconductor integrated circuit 212 executing battery charging control operation according to the first embodiment.

The wireless power transmission system for a multifunctional cellular phone illustrated in FIG. 1 is configured by a power transmission circuit 1, a power reception circuit 2, and a power-reception-side system 3. Particularly, in the wireless power transmission system for a multifunctional cellular phone illustrated in FIG. 1, by reception of an RF signal from a power-transmission-side antenna coil 13 by a power-reception-side antenna coil 25, charging of a secondary cell 26 and power supply to the power-reception-side system 3 are executed.

Power Transmission Circuit on Transmission Side

As illustrated in FIG. 1, to the power transmission circuit 1 on the transmission side of the wireless power transmission system, AC power is supplied via an AC adapter 10. The power transmission circuit 1 is configured by a microcontroller unit (MCU) 11 and a power-transmission control circuit 12. The microcontroller unit (MCU) 11 has an authentication processing function 111 and an encryption processing function 112, the power-transmission control circuit 12 includes a rectifier circuit 121 and an RF driver 122, and the RF driver 122 is coupled to the power-transmission-side antenna coil 13.

A DC power supply voltage generated by rectifying and smoothing AC power supplied via the AC adapter 10 by the rectifier circuit 121 is supplied to the microcontroller unit (MCU) 11, the RF driver 122, and the like in the power transmission circuit 1. The authentication processing function 111 and the encryption processing function 112 of the microcontroller unit (MCU) 11 of the power transmission circuit 1 are provided to execute a mutual authentication process for determining whether the user of the multifunctional cellular phone as the power reception circuit 2 is a user having the right of use or not and an encryption process for preventing falsification of communication data, respectively. That is, the microcontroller unit (MCU) 11 of the power transmission circuit 1 executes key management operations related to generation, holding, updating, deleting, and the like of an encryption key related to the communication protocol between the authentication processing function 221 and the encryption processing function 222 of the microcontroller unit (MCU) 22 included in the power reception circuit 2.

As a result, when it is determined by the microcontroller unit (MCU) 11 of the power transmission circuit 1 that the user of the multifunctional cellular phone as the power reception circuit 2 is a user having the right of use, the RF driver 122 generates an RF drive signal supplied to the power-transmission-side antenna coil 13 in response to an RF oscillation output signal generated from a not-illustrated RF oscillator. Further, communication data of the authentication process and the encryption process from the microcontroller unit (MCU) 11 of the power transmission circuit 1 is supplied via the RF driver 122, the power-transmission-side antenna coil 13, and the power-reception-side antenna coil 25 to the power reception circuit 2.

Power Reception Circuit on Reception Side

As illustrated in FIG. 1, the power reception circuit 2 on the reception side of the wireless power transmission system is configured by a power-reception control circuit 21 and a microcontroller unit (MCU) 22, the microcontroller unit (MCU) 22 has an authentication processing function 221 and an encryption processing function 222, and the power-reception control circuit 21 includes a rectifier circuit 211 and the semiconductor integrated circuit 212 for battery charging control.

In the wireless power transmission system illustrated in FIG. 1, first, communication according to the above-described communication protocol between the microcontroller unit (MCU) 11 of the power transmission circuit 1 and the microcontroller unit (MCU) 22 of the power reception circuit 2 is executed via the power-transmission-side antenna coil 13 and the power-reception-side antenna coil 25. For the communication, in the power reception circuit 2, serial communication, power supply, and the like can be performed between the power-reception control circuit 21 and the microcontroller unit (MCU) 22. When it is determined by the microcontroller unit (MCU) 11 of the power transmission circuit 1 that the user of the multifunctional cellular phone as the power reception circuit 2 is a user having the right of use, an RF drive signal generated from the RF driver 122 is supplied to the power reception circuit 2 via the power-transmission-side antenna coil 13 and the power-reception-side antenna coil 25.

A DC power supply voltage generated by rectifying and smoothing the RF signal supplied via the power-transmission-side antenna coil 13 and the power-reception-side antenna coil 25 is supplied to the semiconductor integrated circuit 212 and the microcontroller unit (MCU) 22. The DC power supply voltage supplied from a rectifier circuit 211 to the semiconductor integrated circuit 212 is used for charging the secondary cell 26 and also used for power supply to the power-reception-side system 3.

In the case where the reception side of the wireless power transmission system is a multifunctional cellular phone, the power-reception-side system 3 includes an application processor, a baseband processor, a liquid crystal display driver IC, an RF signal process semiconductor integrated circuit (RFIC), a main memory, a nonvolatile memory such as a flash memory, and the like.

In the case where the reception side of the wireless power transmission system is a portable personal computer such as a tablet PC, the power-reception-side system 3 further includes a central processing unit (CPU) and a flash memory storage of large-scale storage capacity as a replacement for a hard disk.

Further, to the semiconductor integrated circuit 212 for battery charging control and system power supply, not only DC power supply voltage generated by the rectifier circuit 211, USB power supply voltage from a USB coupling interface 23, and AC-DC conversion power supply voltage generated by rectification/smoothing of AC power supply voltage from an AC power supply coupling interface 24 can be supplied. Therefore, the semiconductor integrated circuit 212 for battery charging control and system power supply has the function of automatically selecting power supply voltage for battery charging control and system power supply from a plurality of power supply voltages of the DC power supply voltage of the rectifier circuit 211, the USB power supply voltage of the USB coupling interface 23, and the AC-DC conversion power supply voltage of the AC power supply coupling interface 24, USB stands for Universal Serial Bus.

Further, in the wireless power transmission system illustrated in FIG. 1, the power transmission circuit 1 on the power transmission side and the power reception circuit 2 on the power reception side execute wireless power transmission (wireless power supply) for charging the secondary cell 26 and power supply to the power-reception-side system 3 and also execute NFC between the power transmission circuit 1 on the power transmission side as a port device and the power reception circuit 2 on the reception side as a mobile device. Further, by executing the NFC and the wireless power supply in a time division manner, while executing charging of the secondary cell 26 of the power reception circuit 2 on the reception side as a mobile device, the NFC between the power transmission circuit 1 on the power transmission side as a port device and the power reception circuit 2 on the reception side as a mobile device can be executed. By the NFC, the power reception circuit 2 on the reception side as a mobile device can use the wired or wireless Internet environment coupled to the power transmission circuit 1 on the power transmission side as a port device.

Configuration of Semiconductor Integrated Circuit for Battery Charging Control

FIG. 2 is a diagram illustrating the configuration of the semiconductor integrated circuit 212 for battery charging control according to the first embodiment shown in FIG. 1.

As illustrated in FIG. 2, the semiconductor integrated circuit 212 for battery charging control and system power supply includes a step-down DC-DC converter 2121, a linear regulator 2122, a USB type detecting circuit 2123, an input voltage selecting circuit 2124, an external interface 2125, a built-in regulator 2126, and a gate drive control circuit 2127. Further, the semiconductor integrated circuit 212 for battery charging control and system power supply includes a P-channel MOS transistor MP3 and switches SW1, SW2, SW3, and SW4.

To a supply terminal T1 of a first input voltage 1, a wireless power supply voltage of the power transmission circuit 1 is supplied via a first schottky diode D1, and an AC-DC conversion power supply voltage of the AC power supply coupling interface 24 is supplied via a second schottky diode D2. To a supply terminal T2 of a second input voltage 2, a USB power supply voltage of the USB coupling interface 23 is supplied. The schottky diodes D1 and D2 function as backflow preventing elements between the wireless power supply voltage of the power transmission circuit 1 and the AC-DC conversion power supply voltage of the AC power supply coupling interface 24 and also function as voltage transmission elements for transmitting a power supply voltage as forward voltage lower than that in a PN junction diode. The wireless power supply voltage of the power transmission circuit 1 is a voltage of 5.5 volts to 20 volts, the AC-DC conversion power supply voltage of the AC power supply coupling interface 24 is a voltage of about seven volts, and the USB power supply voltage of the USB coupling interface 23 is a voltage of five volts.

To the step-down DC-DC converter 2121, an inductor L1 and a capacitor C1 are coupled via external terminals DDOUT1 (T5) and DDOUT2 (T6). Therefore, the step-down DC-DC converter 2121 operates as a switching regulator whose starting at the time of power on is slower than that of the linear regulator 2122 but having power efficiency higher than that of the linear regulator 2122. On the other hand, the linear regulator 2122 operates a series regulator which operates promptly after the power on.

That is, the step-down DC-DC converter 2121 and the linear regulator 2122 generate a system supply voltage of about 3.5 volts to 5 volts from the wireless power supply voltage of the power transmission circuit 1 of 5.5 volts to 20 volts or the AC-DC conversion power supply voltage of the AC power supply coupling interface 24. Therefore, the system supply voltage of five volts from the step-down DC-DC converter 2121 and the linear regulator 2122 is supplied to the power-reception-side circuit 3 via the switches SW2 and SW4 and an external terminal SYS (T4). On the other hand, the USB power supply voltage of the USB coupling interface 23 of five volts is supplied to the power-reception-side system 3 via the switch SW3 and the external terminal SYS (T4).

The USB type detecting circuit 2123 detects the type of the USB coupling interface 23, which is any of USB1.1, USB1.0, USB2.0, and USB3.0, on the basis of the bit rate of differential data signals D+ and D− of the USB coupling interface 23 or the power supply capability of the supply terminal T2 of the second input voltage 2.

The input voltage selecting circuit 2124 executes voltage detection of the supply terminal T1 of the first input voltage 1 and voltage detection of the supply terminal T2 of the second input voltage 2 for selecting the operation mode at the time of starting and, further, executes on/off control of the switches SW1, SW2, SW3, and SW4 and control of the step-down DC-DC converter 2121, the built-in regulator 2126, and the gate drive control circuit 2127. Further, the input voltage selecting circuit 2124 executes control of the USB type detecting circuit 2123 and has the function of supplying USB type detection data obtained by the USB type detecting circuit 2123 to the microcontroller unit (MCU) 22 and the power-reception-side system 3 via the external interface 2125.

Therefore, the external interface 2125 executes bidirectional communication of clocks and serial data between the power-reception-side system 3 and the microcontroller unit (MCU) 22.

To the built-in regulator 2126, the wireless power supply voltage of the power transmission circuit 1 or the AC-DC conversion power supply voltage of the AC power supply coupling interface 24 is supplied via the step-down DC-DC converter 2121 or the linear regulator 2122 or the USB power supply voltage of the USB coupling interface 23 is supplied. As a result, an operation voltage $V_{DD}18$ of 1.8 volts and an operation voltage $V_{DD}30$ of 3.0 volts are generated from the built-in regulator 2126 and supplied to the microcontroller unit (MCU) 22.

The P-channel MOS transistor MP3 is controlled to the on state by the input voltage selecting circuit 2124 and the gate drive control circuit 2127 to supply the system supply voltage of 3.5 volts to five volts of the external terminal SYS (T4) to the secondary cell 26 via an external terminal BAT (T3), thereby executing charging of the secondary cell 26. For example, the secondary cell 26 is a lithium ion cell which is provided in a multifunctional cellular phone or the like and its charging current is a relatively large current of about 0.5 A to 1.0 A.

Further, the gate drive control circuit 2127 generates an output signal for driving the gate of the P-channel MOS transistor MP3 so that the P-channel MOS transistor MP3 is bidirectionally conductive between the external terminal SYS (T4) and the external terminal BAT (T3) Therefore, in the period in which the secondary cell 26 is charged, charging current of the secondary cell 26 is passed from the external terminal SYS (T4) to the external terminal BAT (T3). On the contrary, in the battery operation period by discharging of the secondary cell 26, discharging current is passed from the external terminal BAT (T3) to the external terminal SYS (T4). The gate drive control circuit 2127 also has the function of preventing overcharge and over discharge by executing the current control on the charging current and the discharging current between the charging operation and the discharging operation of the secondary cell 26.

The semiconductor integrated circuit 212 for battery charging control according to the first embodiment illustrated in FIG. 2 is controlled so that the operation of the step-down DC-DC converter 2121 is stopped in the period of NFC. However, also in a state where the step-down DC-DC converter 2121 stops, the linear regulator 2122 continues the operation. Consequently, the linear regulator 2122 supplies power mainly to the input voltage selecting circuit 2124 and the microcontroller unit 22. Therefore, as long as the power supply voltage is supplied to the input terminal T1, also in a state where the operation of the step-down DC-DC converter 2121 stops, power is supplied from the linear regulator 2122 to the input voltage selecting circuit 2124 and the microcontroller unit 22.

Functions of External Terminals of Semiconductor Integrated Circuit

FIG. 3 is a diagram illustrating the functions of external terminals of the semiconductor integrated circuit 212 for battery charging control according to the first embodiment shown in FIG. 2.

As illustrated in FIG. 3, the external supply terminal of the first input voltage 1 has the function of supplying the wireless power supply voltage of the power transmission circuit 1 or the AC-DC conversion power supply voltage of the AC power supply coupling interface 24 via the first schottky diode D1 or the second schottky diode D2.

Further, the external supply terminal of the second input voltage 2 has the function of supplying the USB power supply voltage of the USB coupling interface 23.

The external supply terminal of the differential data signal D+ has the function of supplying the non-inversion input signal D+ of the differential data of the USB coupling interface 23.

The external supply terminal of the differential data signal D− has the function of supplying the inversion input signal D− of the differential data of the USB coupling interface 23.

An external input/output terminal of a clock has the function of executing bidirectional communication of a clock of the external interface 2125.

An external input/output terminal of serial data has the function of executing bidirectional communication of serial data of the external interface 2125.

The external terminal DDOUT1 has the function of outputting a switching output signal by switching regulator operation in the step-down DC-DC converter 2121.

The external terminal DDOUT2 has the function of outputting output voltage of the step-down DC-DC converter 2121, passed through a low-pass filter configured by the inductor L1 and the capacitor C1.

The external terminal SYS has the function of outputting the power supply voltage to the power-reception-side system 3.

The external terminal BAT has the function of coupling the secondary cell 26.

The external terminal $V_{DD}18$ has the function of outputting the operation voltage $V_{DD}18$ of 1.8 volts to the microcontroller unit (MCU) 22.

The external terminal $V_{DD}30$ has the function of outputting the operation voltage $V_D30$ of 3.0 volts to the microcontroller unit (MCU) 22.

Basic Configuration of Power Supply and Charging

Figure 4:
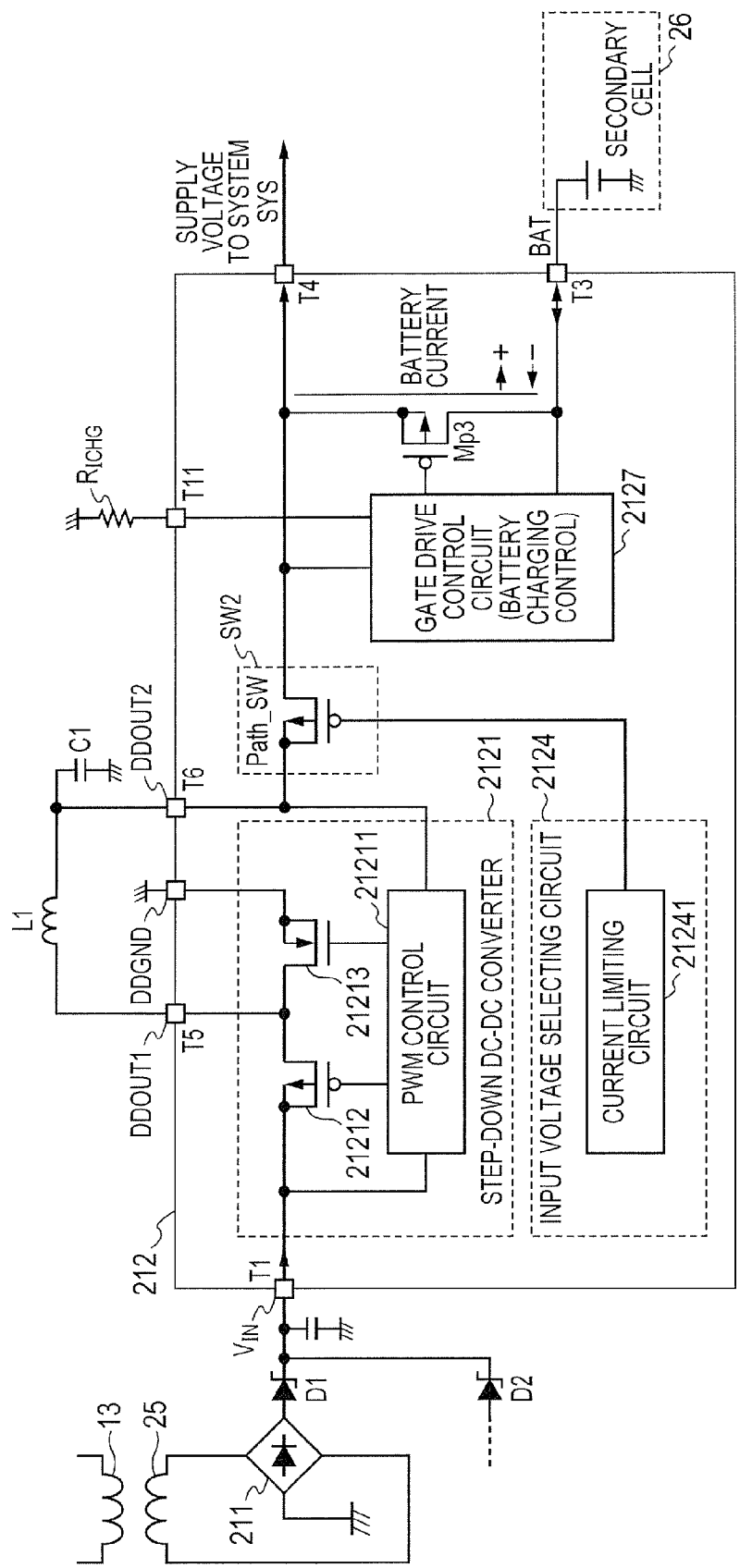
FIG. 4 is a diagram illustrating a basic configuration for power supply to a power-reception-side system and charging of a secondary cell, of the semiconductor integrated circuit for battery charging control according to the first embodiment shown in FIG. 2.

FIG. 4 is a diagram illustrating a basic configuration for power supply to the power-reception-side system 3 and charging of the secondary cell 26, of the semiconductor integrated circuit 212 for battery charging control according to the first embodiment shown in FIG. 2.

As illustrated in FIG. 4, a DC power supply voltage $V_{IN}$ generated when an RF signal from the power-transmission-side antenna coil 13 is received by the reception-side antenna coil 25 and an RF signal of the power-reception-side antenna coil 25 is rectified and smoothed by the rectifier circuit 211 is supplied to the supply terminal T1 of the semiconductor integrated circuit 212 via the schottky diode D1. The step-down DC-DC converter 2121 is coupled to the supply terminal T1, and the step-down DC-DC converter 2121 includes a PWM control circuit 21211, a P-channel MOS transistor 21212 as a high-side switch, and an N-channel MOS transistor 21213 as a low-side switch. The DC power supply voltage $V_{IN}$ is supplied to the source of the P-channel MOS transistor 21212, the drain of the P-channel MOS transistor 21212 and the drain of the N-channel MOS transistor 21213 are coupled to one end of the inductor L1 via the external terminal DDOUT1 (T5), and the source of the N-channel MOS transistor 21213 is coupled to a grounding potential via an external grounding terminal DDGND.

When the PWM control circuit 21211 performs PWM driving to the gate of the P-channel MOS transistor 21212 and the gate of the N-channel MOS transistor 21213, a system supply voltage generated at a coupling node to which the other end of the inductor L1 and one end of the capacitor C1 are coupled is supplied to a negative feedback terminal of the PWM control circuit 21211 via the external terminal DDOUT2 (T6). The PWM control circuit 21211 PWM controls the ratio between the on period of the P-channel MOS transistor 21212 and the on period of the N-channel MOS transistor 21213 so that the system supply voltage of the negative feedback terminal becomes a predetermined voltage level.

The system supply voltage from the step-down DC-DC converter 2121 generated at the external terminal DDOUT2

(T6) is supplied to the source of a P-channel MOS transistor Path_SW as a component of the switch SW2, and the drain of the P-channel MOS transistor Path_SW is coupled to the external terminal SYS (T4), the drain of the P-channel MOS transistor MP3, and the gate drive control circuit 2127. Since the gate of the P-channel MOS transistor Path_SW of the switch SW2 is coupled to a current limiting circuit 21241 included in the input voltage selecting circuit 2124, the maximum value of sum current of the system power supply current and the battery charging current flowing in the source/drain path of the P-channel MOS transistor Path_SW is adjusted by the current limiting circuit 21241.

The gate of the P-channel MOS transistor Mp3 for supplying the battery charging current to the secondary cell 26 via the external terminal BAT (T3) is coupled to the gate drive control circuit 2127, one end of a resistor $R_{ICHG}$ is coupled to the gate drive control circuit 2127 via the external terminal T11, and the other end of the resistor $R_{ICHG}$ is coupled to the grounding potential. As a result, by adjusting the resistance value of the resistor $R_{ICHG}$, the maximum value of the battery charging current flowing in the source/drain path of the P-channel MOS transistor Mp3 can be adjusted.

Detailed Configuration of Power Supply and Charging

FIG. 5 is a diagram illustrating a detailed configuration for power supply to the power-reception-side system 3 and charging of the secondary cell 26, of the semiconductor integrated circuit 212 for battery charging control according to the first embodiment shown in FIG. 4.

As illustrated in FIG. 5, the current limiting circuit 21241 of the semiconductor integrated circuit 212 according to the first embodiment illustrated in FIG. 4 includes a differential amplifier 212411, an offset voltage circuit 212412, P-channel MOS transistors MP2 and MP3, a voltage control circuit 212413, N-channel MOS transistors MN2 and MN3, and a resistor R_limit.

The gate of the P-channel MOS transistor MP2 is coupled to the gate of the P-channel MOS transistor MP1 as the P-channel MOS transistor Path_SW as a component of the switch SW2, and the ratio between the device size of the P-channel MOS transistor MP1 and the device size of the P-channel MOS transistor MP2 is set to M:1. The source of the P-channel MOS transistor MP1, the source of the P-channel MOS transistor MP2, and one end of the resistor R3 are coupled to the external terminal DDOUT2 (T6), and the gate of the P-channel MOS transistor MP1, the gate of the P-channel MOS transistor MP2, and the other end of the resistor R3 are coupled to the source of the P-channel MOS transistor MP3.

The voltage control circuit 212413 includes a voltage comparison amplifier AMP and an N-channel MOS transistor MN4. The inversion input terminal – of the voltage comparison amplifier AMP is coupled to the drain of the P-channel MOS transistor MP1 as the P-channel MOS transistor Path_Sw of the switch SW2, and the non-inversion input terminal + of the voltage comparison amplifier AMP is coupled to the drain of the N-channel MOS transistor MN4 and the drain of the P-channel MOS transistor MP2.

One end of the resistor R_limit is coupled to the source of the N-channel MOS transistor MN4 of the voltage control circuit 212413 and the other end of an offset voltage Voffset of the offset voltage circuit 212412, and the other end of the resistor R_limit is coupled to the ground potential via the drain/source path of the N-channel MOS transistor MN3. A reference voltage $V_{REF\_U}$ is supplied to the other end of the second offset voltage Voffset of the offset voltage circuit 212412, and one end of the first offset voltage Voffset and one end of the second offset voltage Voffset are coupled to the non-inversion input terminal + of the differential amplifier 212411 and the first inversion input terminal –, respectively. An input voltage detection output voltage $V_{IN\_DIV}$ generated from the input voltage selecting circuit 21242 is supplied to the second inversion input terminal – of the differential amplifier 212411 via the low-pass filter 21243. An output terminal of the differential amplifier 212411 is coupled to the gate of the P-channel MOS transistor MP3, and the drain of the P-channel MOS transistor MP3 is coupled to the grounding potential via the drain/source path of the N-channel MOS transistor MN2.

The input voltage detecting circuit 2124 includes resistors R1 and R2, the N-channel MOS transistor MN1, and the offset current supply Ioffset, the DC power supply voltage $V_{IN}$ of the supply terminal T1 is supplied to one end of the resistor R1, and the other end of the resistor R1 is coupled to one end of the offset current supply Ioffset and one end of the resistor R2. The other end of the offset current supply Ioffset is coupled to the grounding potential, and the other end of the resistor R2 is coupled to the grounding potential via the drain/source path of the N-channel MOS transistor MN1. A detection voltage generated from a coupling node between the other end of the resistor R1 and one end of the resistor R2 is supplied to the input terminal of the low-pass filter 21243.

The low-pass filter 21243 includes a resistor $R_{LPF}$ and a capacitor $C_{LPF}$, one of the resistor $R_{LPF}$ is coupled to the input terminal of the low-pass filter 21243, the other end of the resistor $R_{LPF}$ is coupled to the output terminal of the low-pass filter 21243 and one end of the capacitor $C_{LPF}$, and the other end of the capacitor $C_{LPF}$ is coupled to the grounding potential.

An on/off control signal is supplied to the gate of the N-channel MOS transistor MN1 of the input voltage detecting circuit 21242 and the gates of the N-channel MOS transistors MN2 and MN3 of the current limiting circuit 21241. In the case of setting the input voltage detecting circuit 21242 and the current limiting circuit 21241 to an active state, the N-channel MOS transistor MN1 of the input voltage detecting circuit 21242 and the N-channel MOS transistors MN2 and MN3 of the current limiting circuit 21241 are controlled to the on state, and the P-channel MOS transistors MP1 and MP2 are controlled to an active state. In the case of setting the input voltage detecting circuit 21242 and the current limiting circuit 21241 to an inactive state, the N-channel MOS transistor MN1 of the input voltage detecting circuit 21242 and the N-channel MOS transistors MN2 and MN3 of the current limiting circuit 21241 are controlled to the off state by the on/off control signal of the low level, and the P-channel MOS transistors MP1 and MP2 are controlled to an inactive state.

The current limiting circuit 21241 executes current limiting operation of limiting the maximum value of sum current of the system power supply current and the battery charging current flowing in the source/drain path of the P-channel MOS transistor MP1 as the P-channel MOS transistor Path_SW as a component of the switch SW2 as follows. That is, the current limiting circuit 21241 selects a low voltage level from the first and second inversion input terminals – of the differential amplifier 212411, and controls the drain current of the P-channel MOS transistor MP2 so that the voltage level of the non-inversion input terminal + of the differential amplifier 212411 matches the selected low voltage level.

The P-channel MOS transistor MP2 of the current limiting circuit 21241 and the P-channel MOS transistor MP1 as the P-channel MOS transistor Path_SW as a component of the switch SW2 function as an input transistor and an output transistor, respectively, of a current mirror. When the drain current of the P-channel MOS transistor MP2 functioning as the input transistor of the current mirror by the current limiting circuit 21241, the drain current of the P-channel MOS transistor MP1 functioning as an output transistor of the current mirror is set. On the other hand, the voltage control circuit 212413 of the current limiting circuit 21241 negative-feedback-controls the drain voltage of the P-channel MOS transistor MP2 so that the drain voltage of the P-channel MOS transistor MP2 functioning as the input transistor of the current mirror and the drain voltage of the P-channel MOS transistor MP1 functioning as an output transistor of the current mirror match. As a result, the ratio between the drain current of the P-channel MOS transistor MP1 and the drain current of the P-channel MOS transistor MP2 is accurately set by the ratio of M:1 between the device size of the P-channel MOS transistor MP1 and the device size of the P-channel MOS transistor MP2.

Current Limiting Operation in the Case where DC Power Supply Voltage is at Low Level In the case where the DC power supply voltage $V_{IN}$ supplied to the supply terminal T1 is at the low level, the level of the input voltage detection output voltage $V_{IN}$ DIV of the second inversion input terminal − of the differential amplifier 212411 is lower than that of the sum voltage Voffset+$V_{REF\_U}$ of the second offset voltage Voffset supplied to the first inversion input terminal − of the differential amplifier 212411 and the reference voltage $V_{REF\_U}$. As a result, the sum voltage Voffset+$V_{\_limit}$ of the current limit detection voltage V_limit of the resistor R_limit at the voltage level of the non-inversion input terminal + of the differential amplifier 212411 and the first offset voltage Voffset is controlled so as to match the input voltage detection output voltage VIN_DIV of the low level of the second input terminal − of the differential amplifier 212411. That is, by the control on the drain current of the P-channel MOS transistor MP2 by the differential amplifier 212411 in response to the low-level input voltage detection output voltage $V_{IN\_DIV}$, the maximum value of the sum current flowing in the source/drain path of the P-channel MOS transistor MP1 as the P-channel MOS transistor Path_SW as a component of the switch SW2 is adjusted to the low level. The sum current flowing in the source/drain path of the P-channel MOS transistor MP1 is sum current of the system power supply current and the battery charging current. As a result, in the case where the DC power supply voltage $V_{IN}$ supplied to the supply terminal T1 is at the low level, the supply power of the wireless power supply is small, and the load current such as the charging current of the secondary cell 26 is large, the possibility that the step-down DC-DC converter 2121 stops can be lessened.

The sum current of the system power supply current and the battery charging current is, as understood from FIG. 4, supplied from the rectifier circuit 211 and the reception-side antenna coil 25 via the source-drain path of the P-channel MOS transistor Path_SW as a component of the switch SW2, the step-down DC-DC converter 2121, and the supply terminal T1 of the first input voltage 1. In the case where the DC power supply voltage $V_{IN}$ at the supply terminal T1 is at the low level and the power supply capability from the rectifier circuit 211 and the reception-side antenna coil 25 is at the low level like in a communication operation period of NFC, if sum current of large current which is not controlled by the current limiting operation of the current limiting circuit 21241 illustrated in FIGS. 4 and 5 flows, a large voltage drop occurs in the impedance of the rectifier circuit 211 and the reception-side antenna coil 25. As a result, by the large voltage drop, the DC power supply voltage $V_{IN}$ supplied to the supply terminal T1 decreases to a voltage level lower than the operation lower limit voltage of the step-down DC-DC converter 2121, so that the converter operation by switching of the step-down DC-DC converter 2121 stops.

However, by the current limiting operation of the current limiting circuit 21241 according to the first embodiment illustrated in FIGS. 4 and 5, the level of the sum current of the system power supply current and the battery charging current is controlled to the low level in accordance with the low level of the input voltage detection output voltage $V_{IN\_DIV}$ generated from the input voltage detecting circuit 21242 and the low-pass filter 21243. Therefore, the voltage drop in the impedance of the rectifier circuit 211 and the reception-side antenna coil 25 is reduced, and the DC power supply voltage $V_{IN}$ at the supply terminal T1 does not decrease to the voltage level lower than the operation lower limit voltage of the step-down DC-DC converter 2121. Thus, the possibility that the step-down DC-DC converter 2121 stops can be lessened.

In the case where the DC power supply voltage $V_{IN}$ is at the low level, as described above, the sum voltage Voffset+V_limit of the current limit detection voltage V_limit of the resistor R_limit and the first offset voltage Voffset as the voltage level of the non-inversion input terminal + of the differential amplifier 212411 matches the input voltage detection output voltage $V_{IN\_DIV}$ of the low level of the second inversion input terminal − of the differential amplifier 212411. Therefore, the following equation (1) is obtained.

$$V_{IN\_DIV} = V\_limit + V_{offset} \quad\quad \text{Equation (1)}$$

From the above equation (1), the following equation (2) is derived.

$$V\_limit = V_{IN\_DIV} - V_{offset} \quad\quad \text{Equation (2)}$$
$$= \left\{\left(\frac{R_2}{R_1+R_2}\right) \cdot V_{IN} - \left(\frac{R_1 R_2}{R_1+R_2}\right) \cdot I_{offset}\right\} - V_{offset}$$

Current Limiting Operation when DC Power Supply Voltage is High Level

In the case where the DC power supply voltage $V_{IN}$ to be supplied to the supply terminal T1 is at the high level, the level of the input voltage detection output voltage $V_{IN\_DIV}$ of the second inversion input terminal − of the differential amplifier 212411 is higher than that of the sum voltage Voffset+$V_{REF\_U}$ of the second offset voltage Voffset supplied to the first inversion input terminal − of the differential amplifier 212411 and the reference voltage $V_{REF}$ U. As a result, the sum voltage of the current limit detection voltage V_limit of the resistor R_limit as the voltage level of the non-inversion input terminal + of the differential amplifier 212411 and the first offset voltage Voffset is controlled so as to match the sum voltage of the second offset voltage Voffset to be supplied to the first inversion input terminal − of the differential amplifier 212411 and the reference voltage $V_{REF\_U}$. That is, by control of the drain current of the P-channel MOS transistor MP2 by the differential amplifier 212411 responding to the sum voltage Voffset+$V_{REF\_U}$ as a reference voltage, the maximum value of the sum current flowing the source/drain path of the P-channel MOS transistor MP1 as the P-channel MOS transistor Path_SW as a component of the switch SW2 is adjusted to a proper level. The sum current flowing in the source/drain path of the P-channel MOS transistor MP1 is sum current of the system power supply current and the battery charging current. As a result, it can prevent consumption current of the step-down DC-DC converter 2121 from becoming excessive in the case where the DC power supply voltage $V_{IN}$ supplied to the supply terminal T1 is at the high level, the wireless supply power is large, and the load current such as the charging current of the secondary cell 26 is large.

In the case where the DC power supply voltage $V_{IN}$ supplied to the supply terminal T1 is at the high level, as described above, the sum voltage Voffset+V_limit of the current limit detection voltage V_limit of the resistor R_limit and the first offset voltage Voffset matches the sum voltage Voffset+$V_{REF\_U}$ of the second off set voltage Voffest and the reference voltage $V_{REF\_U}$ Therefore, the following equation (3) is obtained.

$$V\_\text{limit}=V_{REF\_U} \quad\quad\quad \text{Equation (3)}$$

Characteristic of Current Limiting Operation

Figure 6:
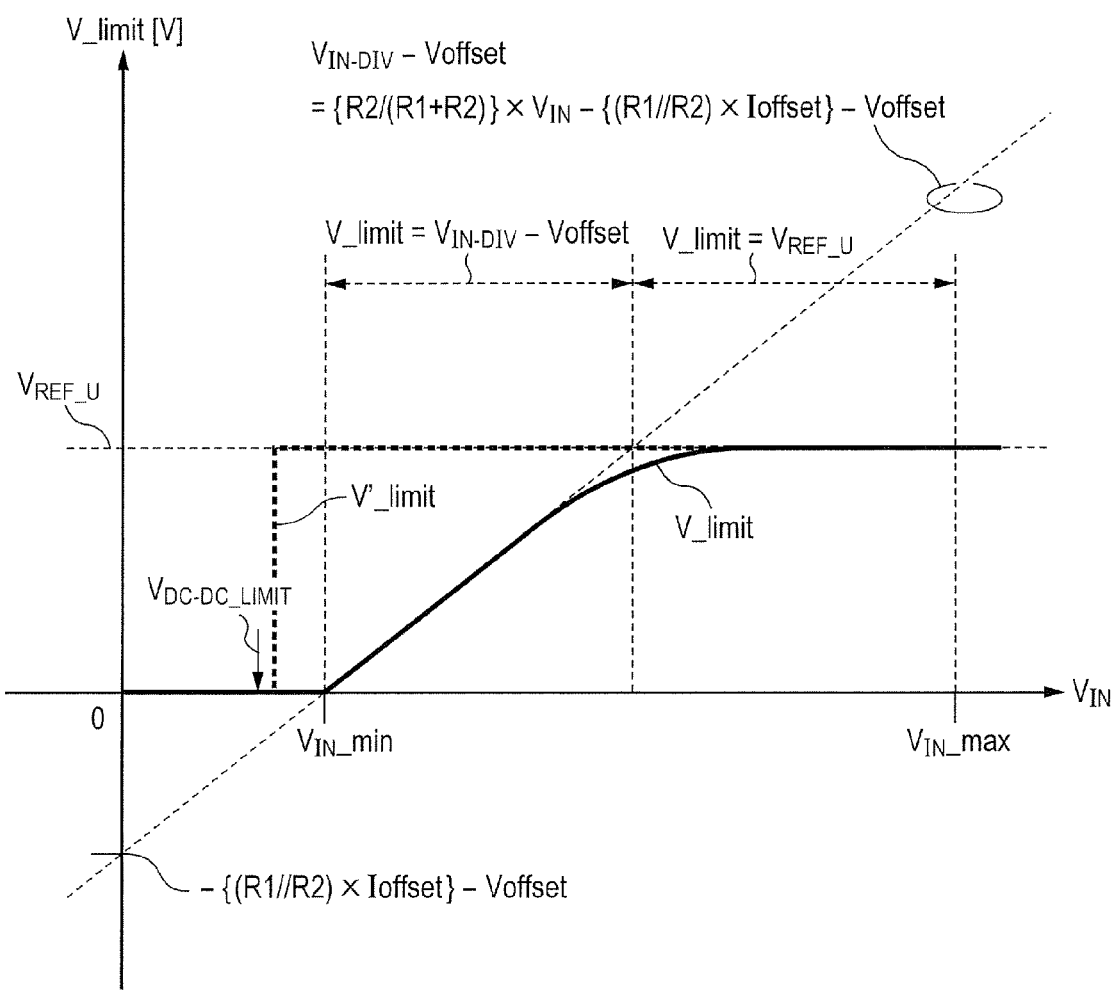
FIG. 6 is a diagram illustrating the characteristic of current limiting operation of a current limiting circuit according to the first embodiment shown in FIGS. 4 and 5.

FIG. 6 is a diagram illustrating the characteristic of current limiting operation of the current limiting circuit 21241 according to the first embodiment shown in FIGS. 4 and 5.

The level of the sum current of the system power supply current and the battery charging current flowing in the source/drain path of the P-channel MOS transistor MP1 as the P-channel MOS transistor Path_SW of the switch SW2 determined by the current limiting operation of the current limiting circuit 21241 according to the first embodiment illustrated in FIGS. 4 and 5 is determined by the current limit detection voltage V_limit of the resistor R_limit.

In the case where the DC power supply voltage $V_{IN}$ supplied to the supply terminal T1 is at the low level, the current limit detection voltage V_limit of the resistor R_limit which determines the level of the sum current flowing in the source/drain path of the P-channel MOS transistor MP1 is calculated by the equation (2). Therefore, as illustrated on the left side of FIG. 6, the current limit detection voltage V_limit of the resistor R_limit decreases in response to the level drop of the DC power supply voltage $V_{IN}$.

For example, when the DC power supply voltage $V_{IN}$ supplied to the supply terminal T1 decreases to a predetermined value $V_{IN\_}$min, the current limit detection voltage V_limit decreases to zero volt, and the level of the sum current flowing in the source/drain path of the P-channel MOS transistor MP1 as the P-channel MOS transistor Path_SW of the switch SW2 decreases to zero ampere. Further, as illustrated on the left side of FIG. 6, even when the DC power supply voltage $V_{IN}$ supplied to the supply terminal T1 drops to a level lower than the predetermined value $V_{IN\_}$min, the current limit detection voltage V_limit is maintained at zero volt, and the level of the sum current flowing in the source/drain path of the P-channel MOS transistor MP1 as the P-channel MOS transistor Path_SW of the switch SW2 is maintained at zero ampere.

FIG. 6 illustrates that an operation lower-limit voltage $V_{DC\text{-}DC\_LIMIT}$ at which converter operation by switching of the step-down DC-DC converter 2121 stops is lower than the predetermined value $V_{IN\_}$min when it is assumed that the impedance of the rectifier circuit 211 and the reception-side antenna coil 25 is zero. Therefore, by the operation lower-limit voltage $V_{DC\text{-}DC\_LIMIT}$ at which converter operation of the step-down DC-DC converter 2121 stops when it is assumed that the above-described impedance is zero, the level of the sum current flowing in the source/drain path of the P-channel MOS transistor MP1 as the P-channel MOS transistor Path_SW of the switch SW2 reliably drops to zero ampere.

Therefore, in the semiconductor integrated circuit 212 for battery charging control in the first embodiment illustrated in FIGS. 4 and 5, in the case where the impedance of the rectifier circuit 211 and the reception-side antenna coil 25 is an unignorable resistance value, the following operation can be realized. That is, the level of the sum current is controlled to a low level in accordance with the low level of the input voltage detection output voltage $V_{IN\_DIV}$ generated from the input voltage detecting circuit 21242 and the low-pass filter 21243 under an operation condition around the operation lower-limit voltage $V_{DC\text{-}DC\_LIMIT}$. As a result, the voltage drop at the impedance of the rectifier 211 and the reception-side antenna coil 25 is reduced, and the possibility that the step-down DC-DC converter 2121 stops can be lessened.

In the case where the DC power supply voltage $V_{IN}$ supplied to the supply terminal T1 is at the high level, the current limit detection voltage V_limit of the resistor R_limit determining the level of the sum current flowing in the source/drain path of the P-channel MOS transistor MP1 is calculated by the following equation (3). Therefore, as illustrated on the right side in FIG. 6, the current limit detection voltage V_limit of the resistor R_limit is substantially unrelated to the level shift of the DC power supply voltage $V_{IN}$ and is maintained substantially constant at the value of the reference voltage $V_{REF\_U}$ supplied to the first inversion input terminal − of the differential amplifier 212411. Therefore, the level of the sum current flowing in the source/drain path of the P-channel MOS transistor MP1 as the P-channel MOS transistor Path_SW of the switch SW2 is properly set to a substantially constant current level. As a result, either the power-reception-side system 3 coupled to the external terminal SYS (T4) or the secondary cell 26 coupled to the external terminal BAT (T3) enters an overload state, current consumption of the step-down DC-DC converter 2121 can be prevented from becoming excessive. As illustrated on the right side in FIG. 6, the maximum value $V_{IN\_}$max of the DC power supply voltage $V_{IN}$ supplied to the supply terminal T1 is 20 volts of the maximum power supply voltage of wireless power supply, and the current limit detection voltage V_limit and the sum current of the P-channel MOS transistor MP1 is maintained constant at the maximum DC power supply voltage $V_{IN\_}$max of 20 volts.

FIG. 6 also illustrates the characteristic of a current limit detection voltage V'_limit of the resistor R_limit in the case where the semiconductor integrated circuit 212 for battery charging control does not have the current limit circuit 21241 for executing current limit operation in response to the DC power supply voltage VIN of the supply terminal T1. Specifically, in the characteristic of the current limit detection voltage V'_limit illustrated in FIG. 6, the current limit detection voltage V'_limit of the operation condition which is equal to or higher than the operation lower-limit voltage $V_{DC\text{-}DC\_LIMIT}$ at which the operation of the step-down DC-DC converter 2121 stops becomes substantially unrelated to the level shift of the DC power supply voltage $V_{IN}$ and is maintained substantially constant at the value of the reference voltage $V_{REF\_U}$. As a result, in this case, even when the DC power supply voltage VIN to be supplied to the supply terminal T1 decreases to the predetermined value $V_{IN\_}$min, the current limit detection voltage V'_limit is maintained constant at the reference voltage $V_{REF\_U}$, and the level of the sum current flowing in the source/drain path of the P-channel MOS transistor MP1 as the P-channel MOS transistor Path_SW of the switch SW2 is maintained at large current. Therefore, by the large sum current of the P-channel MOS transistor MP1 as the P-channel MOS transistor Path_SW of the switch SW2, a large voltage drop is caused in the impedance of the rectifier circuit 211 and the reception-side antenna coil 25. As a result, by the large voltage drop, the DC power supply voltage $V_{IN}$ supplied to the supply terminal T1 decreases to the voltage level lower than the operation lower-limit voltage of the step-down DC-DC converter 2121, so that the converter operation by switching of the step-down DC-DC converter 2121 stops.

In the semiconductor integrated circuit 212 for battery charging control in the first embodiment illustrated in FIG. 5, the second offset voltage Voffset supplied to the first inversion input terminal − of the differential amplifier 212411 makes the input voltage detection output voltage $V_{IN\_DIV}$ supplied to the second inversion input terminal − of the differential amplifier 212411 easily selected as a low-level selection voltage by the differential amplifier 212411. Further, the second offset voltage Voffset also has the function of reducing the influence of an internal error offset voltage related to the non-inversion input terminal + and first and second inversion input terminals − of the differential amplifier 212411. Further, the first offset voltage Voffset supplied to the non-inversion input terminal + of the differential amplifier 212411 also has the function of reducing the influence to the reference voltage $V_{REF\_U}$ by the second offset voltage Voffset supplied to the first inversion input terminal − of the differential amplifier 212411.

Characteristic of Sum Current of Switch

Figure 7:
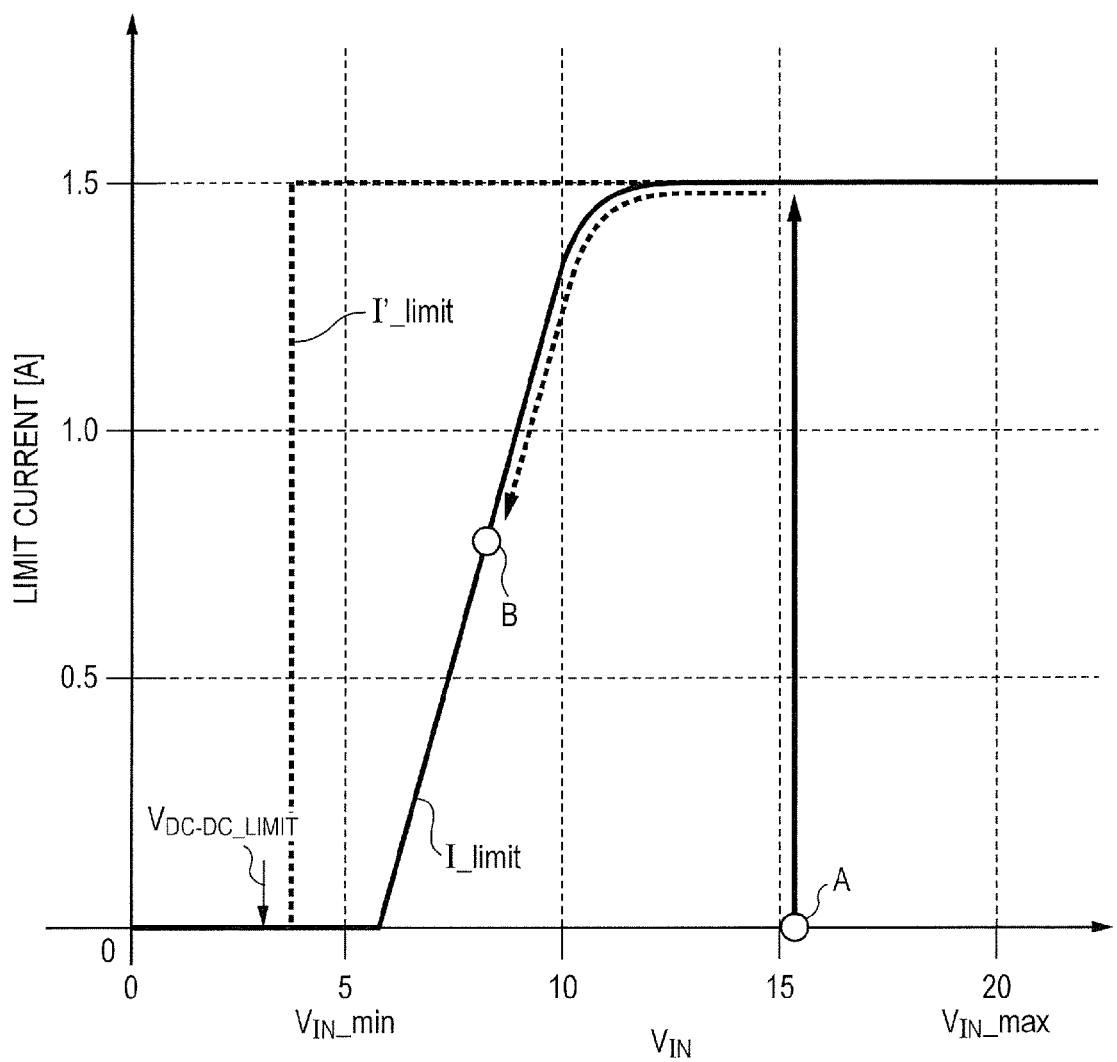
FIG. 7 is a diagram illustrating the characteristic of sum current of a switch realized by the characteristic of the current limiting operation of the current limiting circuit according to the first embodiment shown in FIGS. 4 and 5.

FIG. 7 is a diagram illustrating the characteristic of sum current I_limit of the switch SW2 realized by the characteristic of the current limiting operation of the current limiting circuit 21241 according to the first embodiment shown in FIGS. 4 and 5.

In FIG. 7, an operation point A indicates that the converter operation by switching of the step-down DC-DC converter 2121 starts in an initial state where the C power supply voltage $V_{IN}$ supplied to the supply terminal T1 is about 15 volts.

As a result of starting of the converter operation by switching of the step-down DC-DC converter 2121, the sum current I_limit flowing in the source/drain path of the P-channel MOS transistor MP1 as the P-channel MOS transistor Path_SW of the switch SW2 is determined by the current limiting operation of the current limiting circuit 21241 in the first embodiment illustrated in FIGS. 4 and 5.

Therefore, in the case where the DC power supply voltage $V_{IN}$ to be supplied to the supply terminal T1 is at the high level, depending on the current limit detection voltage V_limit which is substantially maintained at the value of the reference value $V_{REF\_U}$ on the right side of FIG. 6, the sum current I_limit of the switch SW2 also becomes a current value which is substantially maintained constant as illustrated on the right side in FIG. 7. As a result, the sum current I_limit of the switch SW2 illustrated on the right side of FIG. 7 is calculated by the following equation (4).

$$I\_limit = \frac{V\_limit}{R\_limit} = \frac{V_{REF\_U}}{R\_limit} \quad \text{Equation (4)}$$

After that, when the DC power supply voltage $V_{IN}$ to be supplied to the supply terminal T1 changes from the high level to the low level, depending on the current limit detection voltage V_limit which decreases in response to the decrease in the level of the DC power supply voltage $V_{IN}$ as illustrated on the left side of FIG. 6, the sum current I_limit of the switch SW2 also decreases in response to the decrease in the level of the DC power supply voltage $V_{IN}$ as illustrated on the left side of FIG. 7. As a result, the sum current I_limit of the switch SW2 illustrated on the left side of FIG. 7 is calculated by the following equation (5).

$$I\_limit = \frac{V\_limit}{R\_limit} \quad \text{Equation (5)}$$

-continued
$$= \frac{V_{IN\_DIV} - V_{offset}}{R\_limit}$$

$$= \frac{\left\{\left(\frac{R_2}{R_1 + R_2}\right) \cdot V_{IN} - \left(\frac{R_1 R_2}{R_1 + R_2}\right) \cdot I_{offset}\right\} - V_{offset}}{R\_limit}$$

An operation point B in FIG. 7 illustrates a state where the DC power supply voltage $V_{IN}$ of the supply terminal T1 drops from the operation point A as a start point in the initial state where the DC power supply voltage $V_{IN}$ is about 15 volts to around eight volts. At the operation point B to which the DC power supply voltage $V_{IN}$ of the supply terminal T1 drops to around eight volts, the sum current of low-level wireless supply current, system supply current by low-level current limit, and battery charging current is balanced.

FIG. 7 also illustrates the characteristic of a sum current I'_limit of the switch SW2 in the case where the semiconductor integrated circuit 212 for battery charging control does not have the current limiting circuit 21241 executing current limiting operation responding to the level of the DC power supply voltage $V_{IN}$ of the supply terminal T1. That is, in the characteristic of the sum current I'_limit of the switch SW2 illustrated in FIG. 7, the sum current I'_limit under an operation condition which is equal to or higher than the operation lower-limit voltage $V_{DC\text{-}DC\_LIMIT}$ at which the operation of the step-down DC-DC converter 2121 stops becomes unrelated to the level shift of the DC power supply voltage $V_{iN}$ and is maintained substantially constant. Therefore, in this case, even when the DC power supply voltage $V_{IN}$ supplied to the supply terminal T1 drops to the predetermined value $V_{IN\_min}$, the level of the sum current I'_limit flowing in the source/drain path of the P-channel MOS transistor MP1 as the P-channel MOS transistor Path_SW of the switch SW2 is also maintained at constant current. Therefore, by the large sum current of the P-channel MOS transistor MP1 as the P-channel MOS transistor Path_SW of the switch SW2, a large voltage drop is caused in the impedance of the rectifier circuit 211 and the reception-side antenna coil 25. As a result, due to the large voltage drop, the DC power supply voltage VIN supplied to the supply terminal T1 drops to a voltage level lower than the operation lower-limit voltage of the step-down DC-DC converter 2121, so that the converter operation by switching of the step-down DC-DC converter 2121 is stopped.

Figure 8:
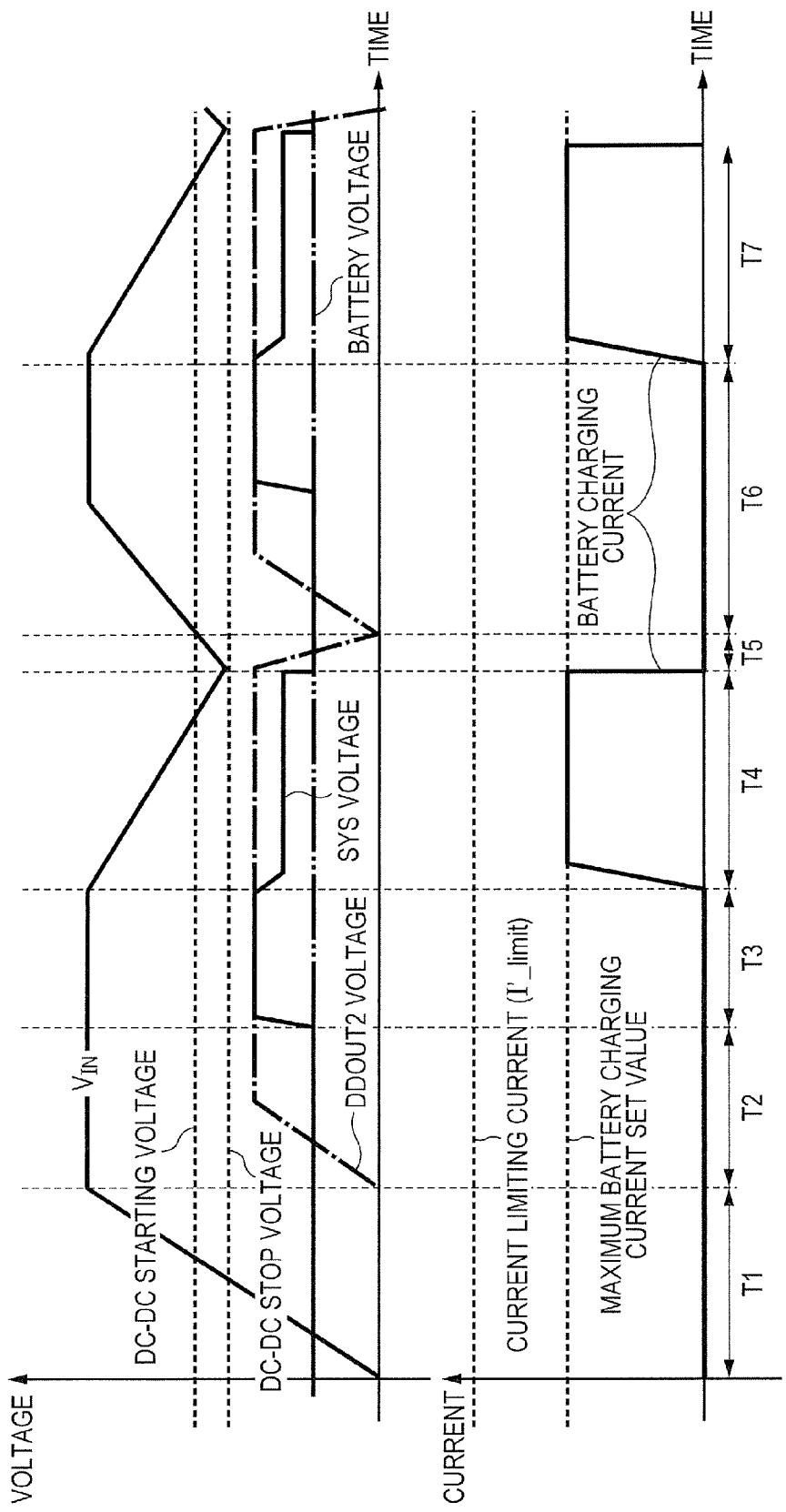
FIG. 8 is a diagram illustrating the operation of the semiconductor integrated circuit in the case where the semiconductor integrated circuit of battery charging control does not have the current limiting circuit executing current limiting operation responding to the level of a DC power supply voltage of a supply terminal.

Operation of Semiconductor Integrated Circuit in the Case where Current Limiting Circuit Executing Current Limiting Operation Responding to DC power Supply Voltage is not Provided FIG. 8 is a diagram illustrating the operation of the semiconductor integrated circuit 212 in the case where the semiconductor integrated circuit 212 of battery charging control does not have the current limiting circuit 21241 executing current limiting operation responding to the level of the DC power supply voltage $V_{IN}$ of the supply terminal T1.

Changes with time in voltage waveforms of parts in the semiconductor integrated circuit 212 are shown in the upper part of FIG. 8, and changes with time in current waveforms of the parts in the semiconductor integrated circuit 212 are shown in the lower part of FIG. 8.

As illustrated by the current waveform in the lower part of FIG. 8, the maximum value of the battery current adjusted by the resistance value of the resistor $R_{ICHG}$ coupled to the external terminal T11 is set to a level lower than the current limiting current I'_limit which is almost constant and is controlled by the current limiting circuit 21241.

In a first period T1 in FIG. 8, supply of the DC power supply voltage $V_{IN}$ of the low level to the supply terminal T1 is started, and the level of the DC power supply voltage $V_{IN}$ of the supply terminal T1 starts rising in accordance with a time constant of the rectifier circuit 211 and the reception-side antenna coil 25. On the other hand, the system supply voltage (SYS voltage) supplied to the power-reception-side system 3 via the external terminal SYS (T4) is set to the battery voltage from the secondary cell 26 in the first period T1.

During the course of the first period T1, the DC power supply voltage $V_{IN}$ of the supply terminal T1 exceeds a DC-DC starting voltage of the step-down DC-DC converter 2121. Consequently, after lapse of start delay time, in a second period T2 in FIG. 8, the converter operation by switching of the step-down DC-DC converter 2121 starts. Therefore, in the second period T2, the output voltage (DDOUT2 voltage) of the step-down DC-DC converter 2121 generated from the external terminal DDOUT2 (T6) starts rising. Since the output voltage (DDOUT2 voltage) of the step-down DC-DC converter 2121 exceeds predetermined voltage in the course of the second period T2, in response to the voltage excess, the input voltage selecting circuit 2124 controls the P-channel MOS transistor MP1 as the P-channel MOS transistor Path_SW of the switch SW2 from the off state to the on state.

As a result, in the third period T3, by the on state of the P-channel MOS transistor MP1 of the switch SW2, the system supply voltage (SYS voltage) of the external terminal SYS (T4) is set by the output voltage (DDOUT2 voltage) of the step-down DC-DC converter 2121 generated from the external terminal DDOUT2 (T6).

Further, in response to a fact that the output voltage (DDOUT2 voltage) of the step-down DC-DC converter 2121 exceeds a predetermined voltage during the course of the second period T2, a timer circuit in the input voltage selecting circuit 2124 controls the P-channel MOS transistor MP3 between the external terminal SYS (T4) and the external terminal BAT (T3) to the on state while executing an operation of counting not-illustrated clock signals.

That is, since the P-channel MOS transistor MP3 between the external terminal SYS (T4) and the external terminal BAT (T3) is controlled to the on state in the fourth period T4, supply of the battery charging current to the secondary cell 26 is started. In the case where the battery charging current amount is large and the battery supply power is larger than transmission power from the rectifier circuit 211, the output voltage of the rectifier circuit 211, that is, the DC power supply voltage $V_{IN}$ of the supply terminal T1 decreases. Therefore, the DC power supply voltage $V_{IN}$ of the supply terminal T1 finally decreases to a voltage level lower than a DC-DC stop voltage of the step-down DC-DC converter 2121, so that the converter operation by switching of the step-down DC-DC converter 2121 stops. The DC-DC stop voltage illustrated in FIG. 4 denotes the above-described operation lower-limit voltage of the step-down DC-DC converter 2121.

In the fifth period T5, in response to the operation top of the step-down DC-DC converter 2121 and the off state of the P-channel MOS transistor MP1 of the switch SW2, the battery charging current is set to zero ampere. As a result, an output voltage of the rectifier circuit 211, that is, the DC power supply voltage $V_{IN}$ of the supply terminal T1 rises. Therefore, in the sixth and seven periods T6 and T7, the operation in the second and third periods T2 and T3 and the operation in the fourth period T4 are repeated.

As described above, in the case where the battery supply power is larger than transmission power from the rectifier circuit 211, the DC power supply voltage $V_{IN}$ of the supply terminal T1 decreases, and the step-down DC-DC converter 2121 stops. Consequently, the battery cannot be charged.

Figure 9:
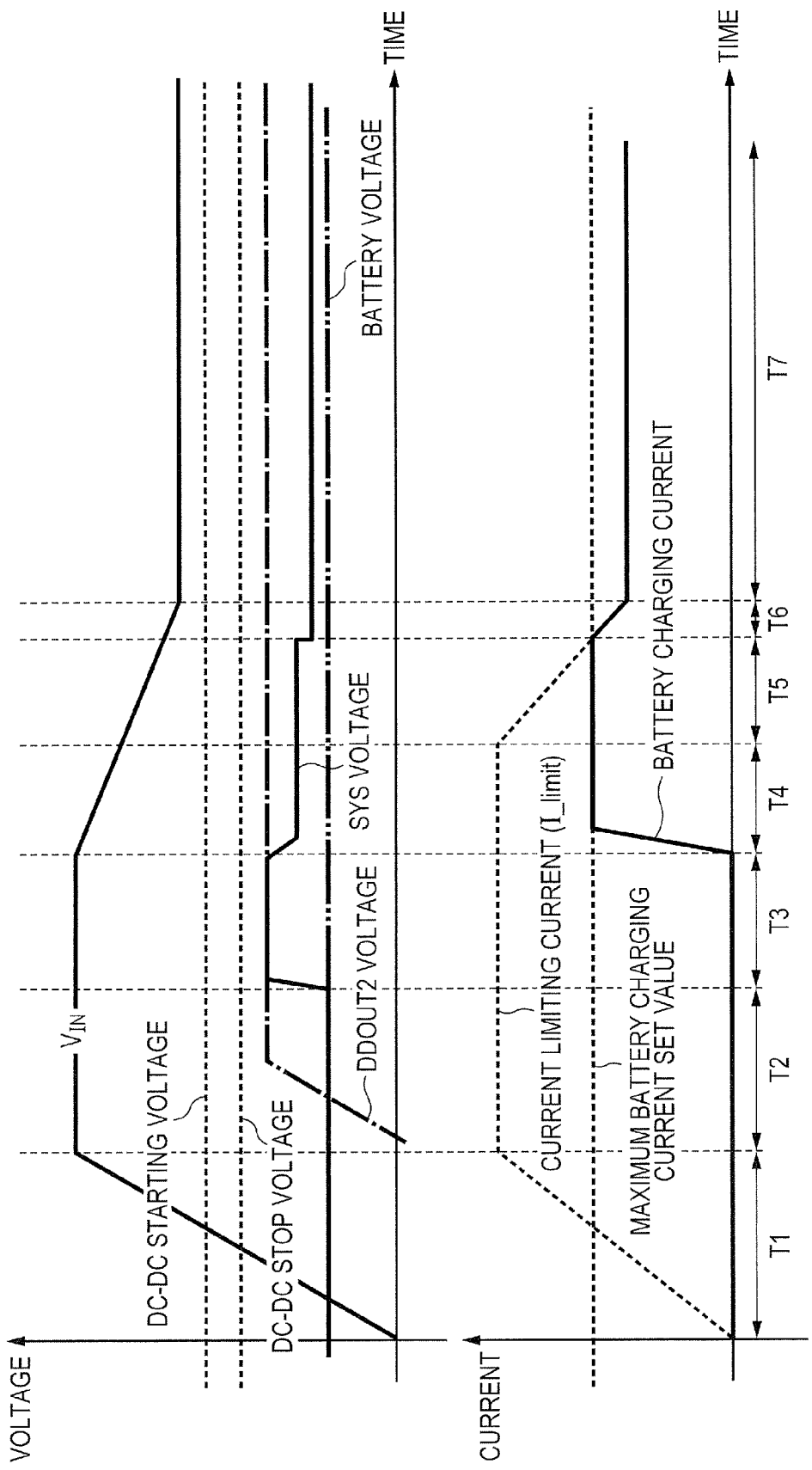
FIG. 9 is a diagram illustrating the operation of the semiconductor integrated circuit in the case where the semiconductor integrated circuit of battery charging control has the current limiting circuit executing current limiting operation responding to the level of a DC power supply voltage of a supply terminal according to the first embodiment shown in FIGS. 4 and 5.

Operation of Semiconductor Integrated Circuit in the Case where Current Limiting Circuit Executing Current Limiting Operation Responding to Level of DC Power Supply Voltage is Provided FIG. 9 is a diagram illustrating the operation of the semiconductor integrated circuit 212 in the case where the semiconductor integrated circuit 212 of battery charging control has the current limiting circuit 21241 executing current limiting operation responding to the level of the DC power supply voltage $V_{IN}$ of the supply terminal T1 according to the first embodiment shown in FIGS. 4 and 5.

Changes with time in voltage waveforms of parts in the semiconductor integrated circuit 212 in the first embodiment are shown in the upper part of FIG. 9, and changes with time in current waveforms of the parts in the semiconductor integrated circuit 212 in the first embodiment are shown in the lower part of FIG. 9.

As illustrated by the current waveform in the lower part of FIG. 9, the maximum value of the battery current adjusted by the resistance value of the resistor $R_{ICHG}$ coupled to the external terminal T11 is set to a level lower than the maximum value of the current limiting current I'_limit responding to the level of the DC power supply voltage $V_{IN}$ of the supply terminal T1 which is controlled by the current limiting circuit 21241.

In a first period T1 in FIG. 9, supply of the DC power supply voltage $V_{IN}$ of the low level to the supply terminal T1 is started, and the level of the DC power supply voltage $V_{IN}$ of the supply terminal T1 starts rising in accordance with a time constant of the rectifier circuit 211 and the reception-side antenna coil 25. On the other hand, the system supply voltage (SYS voltage) supplied to the power-reception-side system 3 via the external terminal SYS (T4) is set to the battery voltage from the secondary cell 26 in the first period T1.

During the course of the first period T1, the DC power supply voltage $V_{IN}$ of the supply terminal T1 exceeds a DC-DC starting voltage of the step-down DC-DC converter 2121. Consequently, after lapse of start delay time, in a second period T2 in FIG. 9, the converter operation by switching of the step-down DC-DC converter 2121 starts. Therefore, in the second period T2, the output voltage (DDOUT2 voltage) of the step-down DC-DC converter 2121 generated from the external terminal DDOUT2 (T6) starts rising. Since the output voltage (DDOUT2 voltage) of the step-down DC-DC converter 2121 exceeds predetermined voltage in the course of the second period T2, in response to the voltage excess, the input voltage selecting circuit 2124 controls the P-channel MOS transistor MP1 as the P-channel MOS transistor Path_SW of the switch SW2 from the off state to the on state.

As a result, in the third period T3, by the on state of the P-channel MOS transistor MP1 of the switch SW2, the system supply voltage (SYS voltage) of the external terminal SYS (T4) is set by the output voltage (DDOUT2 voltage) of the step-down DC-DC converter 2121 generated from the external terminal DDOUT2 (T6).

Further, in response to a fact that the output voltage (DDOUT2 voltage) of the step-down DC-DC converter 2121 exceeds a predetermined voltage during the course of the second period T2, a timer circuit in the input voltage selecting circuit 2124 controls the P-channel MOS transistor MP3 between the external terminal SYS (T4) and the external terminal BAT (T3) to the on state while executing an operation of counting not-illustrated clock signals.

Since the P-channel MOS transistor Mp3 between the external terminal SYS (T4) and the external terminal BAT (T3) is controlled to the on state in the fourth period T4, supply of the battery charging current to the secondary cell 26 is started. However, in the case where the battery charging current amount is large and the battery supply power is larger than transmission power from the rectifier circuit 211, the output voltage of the rectifier circuit 211, that is, the DC power supply voltage $V_{IN}$ of the supply terminal T1 decreases in the fourth period T4.

According to the first embodiment illustrated in FIGS. 4 and 5, in response to the drop of the level of the DC power supply voltage $V_{IN}$ supplied to the supply terminal T1, the current limiting level of the sum current flowing in the source/drain path of the P-channel MOS transistor MP as the P-channel MOS transistor Path_SW of the switch SW2 also decreases.

In the fifth period T5, the current limiting level of the sum current I_limit flowing in the source/drain path of the P-channel MOS transistor MP1 as the P-channel MOS transistor Path_SW of the switch SW2 decreases in response to drop of the level of the DC power supply voltage $V_{IN}$ supplied to the supply terminal T1.

In the sixth period T6, the battery charging current to the secondary cell 26 is set to a low level by the current limiting level of the sum current I_limit of the switch SW2 which is decreasing.

As a result, in the seventh period T7, the battery charging function is suppressed by the current limiting function of the switch SW2 responding to the DC power supply voltage $V_{IN}$ of the supply terminal T1, so that the DC power supply voltage $V_{IN}$ of the supply terminal T1 is maintained at a voltage level higher than the DC-DC stop voltage of the step-down DC-DC converter 2121. Therefore, by using the current limiting circuit 21241 executing the current limiting operation responding to the level of the DC power supply voltage $V_{IN}$ of the supply terminal T1 according to the first embodiment illustrated in FIGS. 4 and 5, the problem that the operation of the step-down DC-DC converter 2121 stops and the battery charging current cannot be supplied can be solved.

Figure 10:
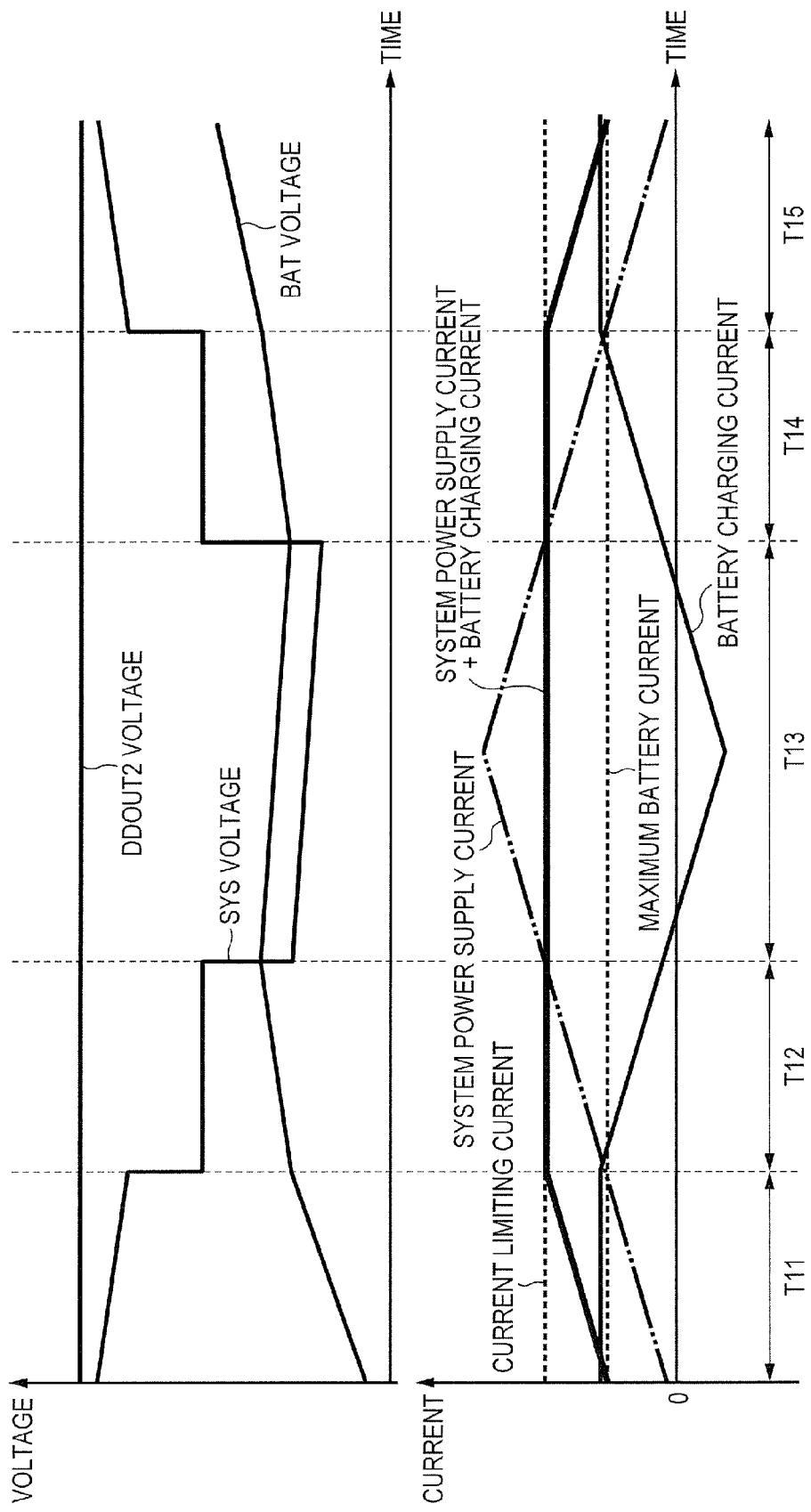
FIG. 10 is a diagram illustrating the operation of the semiconductor integrated circuit in the case of setting a current limiting current of a P-channel MOS transistor of a switch to be higher than a maximum battery current which is adjusted by a resistor in a state where the DC power supply voltage at intermediate level or high level is supplied to the supply terminal by wireless power supply.

Operation in the Case where Current Limiting Current is Set to Higher than Maximum Battery Current at the Time of Wireless Power Supply FIG. 10 is a diagram illustrating the operation of the semiconductor integrated circuit 212 in the case of setting a current limiting current of the P-channel MOS transistor MP1 of the switch SW2 to be higher than a maximum battery current which is adjusted by the resistor $R_{ICHG}$ in a state where the DC power supply voltage $V_{IN}$ at intermediate level or high level is supplied to the supply terminal T1 by wireless power supply.

Changes with time in voltage waveforms of parts in the semiconductor integrated circuit 212 in the first embodiment are shown in the upper part of FIG. 10, and changes with time in current waveforms of the parts in the semiconductor integrated circuit 212 in the first embodiment are shown in the lower part of FIG. 10.

As illustrated in the current waveforms in the lower part of FIG. 10, the maximum value of the current limiting current (I_limit) responding to an almost constant intermediate or high level of the DC power supply voltage $V_{IN}$ of the supply terminal T1 controlled by the current limiting circuit 21241 is set to be higher than the value of the maximum battery current which is adjusted by the resistance value of the resistor $R_{ICHG}$ coupled to the external terminal T11.

In the period T11 in FIG. 10, as illustrated by the current waveforms in the lower part of FIG. 10, the system power supply current supplied to the power-reception-side system 3 increases with lapse of time of wireless power supply, maximum battery current of an almost constant value flows for charging the secondary cell 26, and sum current of the system power supply current and the battery charging current increases. In the period T11 in FIG. 10, as illustrated by the voltage waveforms in the upper part of FIG. 10, the output voltage (DDOUT2 voltage) of the step-down DC-DC converter 2121 is maintained almost constant, the system supply voltage (SYS voltage) of the external terminal SYS (T4) decreases, and the battery voltage (BAT voltage) of the external terminal BAT (T3) increases.

In the period T12 in FIG. 10, as illustrated by the current waveforms in the lower part of FIG. 10, increase in the sum current of the system power supply current and the battery charging current is clamped by a predetermined value of the current limiting current (I_limit) in the P-channel MOS transistor MP1 of the switch SW2. Therefore, in the period T12 in FIG. 10, as time lapses, the system power supply current increases and, on the other hand, the battery charging current decreases. Further, in the period T12 in FIG. 10, as illustrated by the voltage waveforms in the upper part of FIG. 10, the output voltage (DDOUT2 voltage) of the step-down DC-DC converter 2121 is maintained constant, the system supply voltage (SYS voltage) of the external terminal SYS (T4) is also maintained constant, and the battery voltage (BAT voltage) of the external terminal BAT (T3) increases.

In the period T13 in FIG. 10, as illustrated by the current waveforms in the lower part of FIG. 10, increase in the sum current of the system power supply current and the battery charging current is clamped by a constant value of the current limiting current (I_limit) in the P-channel MOS transistor MP1 of the switch SW2. On the other hand, in the period T13 in FIG. 10, the system power supply current exceeds the current limiting current (I_limit) in the P-channel MOS transistor MP1 of the switch SW2 at a clamp level, so that the battery charging current for the secondary cell 26 becomes a negative current value which is equal to or less than zero ampere, and battery discharging current is supplied from the secondary cell 26 to the power-reception-side system 3. Further, in the period T13 in FIG. 10, as illustrated by the voltage waveforms in the upper part of FIG. 10, the output voltage (DDOUT2 voltage) of the step-down DC-DC converter 2121 is maintained constant, the system supply voltage (SYS voltage) of the external terminal SYS (T4) decreases slightly, and the battery voltage (BAT voltage) of the external terminal BAT (T3) also decreases slightly.

In the period T14 in FIG. 10, as illustrated by the current waveforms in the lower part of FIG. 10, the system power supply current decreases to a level lower than the current limiting current (I_limit) in the P-channel MOS transistor MP1 of the switch SW2 of the clamp level. Therefore, in the period T14, the sum current of the system power supply current and the battery charging current is clamped by a constant value of the current limiting current (I_limit) in the P-channel MOS transistor MP1 of the switch SW2, and the battery charging current increases. Further, in the period T14 in FIG. 10, as illustrated by the voltage waveforms in the upper part of FIG. 10, the output voltage (DDOUT2 voltage) of the step-down DC-DC converter 2121 is maintained constant, the system supply voltage (SYS voltage) of the external terminal SYS (T4) is also maintained constant, and the battery voltage (BAT voltage) of the external terminal BAT (T3) increases.

In the period T15 in FIG. 10, as illustrated by the current waveforms in the lower part of FIG. 10, while the battery charging current is maintained to the maximum battery current having an almost constant value, the system power supply current decreases. Consequently, the sum current of the system power supply current and the battery charging current decreases to a level lower than the current limiting current (I_limit) in the P-channel MOS transistor MP1 of the switch SW2. Further, in the period T15 in FIG. 10, as illustrated by the voltage waveforms in the upper part of FIG. 10, the output voltage (DDOUT2 voltage) of the step-down DC-DC converter 2121 is maintained constant, the system supply voltage (SYS voltage) of the external terminal SYS (T4) increases, and the battery voltage (BAT voltage) of the external terminal BAT (T3) also increases.

By the operations of the semiconductor integrated circuit 212 illustrated in FIG. 10, wireless power supply to the power-reception-side system 3 and charging to the secondary cell 26 are executed.

Operation in the Case where Maximum Battery Current is Set to Higher than Current Limiting Current at the Time of Wireless Power Supply FIG. 11 is a diagram illustrating the operation of the semiconductor integrated circuit 212 in the case of setting the maximum battery current which is adjusted by the resistor $R_{ICHG}$ to be higher than the current limiting current of the P-channel MOS transistor MP1 of the switch SW2 in a state where the DC power supply voltage $V_{IN}$ at intermediate level or high level is supplied to the supply terminal T1 by wireless power supply.

Changes with time in voltage waveforms of parts in the semiconductor integrated circuit 212 in the first embodiment are shown in the upper part of FIG. 11, and changes with time in current waveforms of the parts in the semiconductor integrated circuit 212 in the first embodiment are shown in the lower part of FIG. 11.

As illustrated in the current waveforms in the lower part of FIG. 11, the value of the maximum battery current adjusted by the resistance value of the resistor $R_{ICHG}$ coupled to the external terminal T11 is set to be higher than the maximum value of the current limiting current (I_limit) responding to an almost constant intermediate or high level of the DC power supply voltage $V_{IN}$ of the supply terminal T1 controlled by the current limiting circuit 21241.

In the period T11 in FIG. 11, as illustrated by the current waveforms in the lower part of FIG. 11, the system power supply current supplied to the power-reception-side system 3 is maintained almost zero ampere with lapse of time of wireless power supply, and the battery charging current for charging the secondary cell 26 is clamped by a constant value of the current limiting current (I_limit) in the P-channel MOS transistor MP1 of the switch SW2. Therefore, in the period T11 in FIG. 11, the sum current of the system power supply current and the battery charging current is also clamped by a constant value of the current limiting current (I_limit) in the P-channel MOS transistor MP1 of the switch SW2. In the period T11 in FIG. 11, as illustrated by the voltage waveforms in the upper part of FIG. 11, the output voltage (DDOUT2 voltage) of the step-down DC-DC converter 2121 is maintained almost constant, the system supply voltage (SYS voltage) of the external terminal SYS (T4) is also maintained almost constant, and the battery voltage (BAT voltage) of the external terminal BAT (T3) increases.

In the period T12 in FIG. 11, as illustrated by the current waveforms in the lower part of FIG. 11, the sum current of the system power supply current and the battery charging current is clamped by a constant value of the current limiting current (I_limit) in the P-channel MOS transistor MP1 of the switch SW2. On the other hand, in the period T12 in FIG. 11, as time lapses, the system power supply current increases and, on the other hand, the battery charging current decreases. Further, in the period T12 in FIG. 11, as illustrated by the voltage waveforms in the upper part of FIG. 11, the output voltage (DDOUT2 voltage) of the step-down DC-DC converter 2121 is maintained constant, the system supply voltage (SYS voltage) of the external terminal SYS (T4) is also maintained constant, and the battery voltage (BAT voltage) of the external terminal BAT (T3) increases.

In the period T13 in FIG. 11, as illustrated by the current waveforms in the lower part of FIG. 11, increase in the sum current of the system power supply current and the battery charging current is clamped by a constant value of the current limiting current (I_limit) in the P-channel MOS transistor MP1 of the switch SW2. On the other hand, in the period T13 in FIG. 11, the system power supply current exceeds the current limiting current (I_limit) in the P-channel MOS transistor MP1 of the switch SW2 at a clamp level, so that the battery charging current for the secondary cell 26 becomes a negative current value which is equal to or less than zero ampere, and battery discharging current is supplied from the secondary cell 26 to the power-reception-side system 3. Further, in the period T13 in FIG. 11, as illustrated by the voltage waveforms in the upper part of FIG. 11, the output voltage (DDOUT2 voltage) of the step-down DC-DC converter 2121 is maintained constant, the system supply voltage (SYS voltage) of the external terminal SYS (T4) decreases slightly, and the battery voltage (BAT voltage) of the external terminal BAT (T3) also decreases slightly.

In the period T14 in FIG. 11, as illustrated by the current waveforms in the lower part of FIG. 11, the system power supply current decreases to a level lower than the current limiting current (I_limit) in the P-channel MOS transistor MP1 of the switch SW2 of the clamp level. Therefore, in the period T14, the sum current of the system power supply current and the battery charging current is clamped by a constant value of the current limiting current (I_limit) in the P-channel MOS transistor MP1 of the switch SW2, and the battery charging current increases. Further, in the period T14 in FIG. 11, as illustrated by the voltage waveforms in the upper part of FIG. 11, the output voltage (DDOUT2 voltage) of the step-down DC-DC converter 2121 is maintained constant, the system supply voltage (SYS voltage) of the external terminal SYS (T4) is also maintained constant, and the battery voltage (BAT voltage) of the external terminal BAT (T3) increases.

In the period T15 in FIG. 11, as illustrated by the current waveforms in the lower part of FIG. 11, while the system power supply current is maintained to be almost zero ampere, the battery charging current and the sum current of the system power supply current and the battery charging current are clamped by a constant value of the current limiting current (I_limit) in the P-channel MOS transistor MP1 of the switch SW2. Further, in the period T15 in FIG. 11, as illustrated by the voltage waveforms in the upper part of FIG. 11, the output voltage (DDOUT2 voltage) of the step-down DC-DC converter 2121 is maintained constant, the system supply voltage (SYS voltage) of the external terminal SYS (T4) is also maintained constant, and the battery voltage (BAT voltage) of the external terminal BAT (T3) also increases.

By the operations of the semiconductor integrated circuit 212 illustrated in FIG. 11, wireless power supply to the power-reception-side system 3 and charging to the secondary cell 26 are executed.

Although the invention achieved by the inventors of the present invention has been concretely described on the basis of the various embodiments above, obviously, the invention is not limited to the embodiments but can be variously changed without departing from the gist.

For example, an electronic device in which the semiconductor integrated circuit is mounted is not limited to a multi-functional cellular phone and a portable personal computer such as a tablet PC but can be applied to a digital video camera, a digital still camera, a portable music player, a portable DVD player, and the like.

What is claimed is:

1. A semiconductor integrated circuit comprising:
an input terminal;
a DC-DC converter;
an output terminal;
a power supply switch transistor;
a current limiting circuit; and
an input voltage detecting circuit,
wherein a DC input voltage generated by rectifying and smoothing an RF reception signal can be supplied to the input terminal,
wherein the DC-DC converter can generate, from a converter output terminal, a DC output voltage having a desired voltage level from the DC input voltage supplied to the input terminal,
wherein the output terminal can charge an external battery or supply power to an external power-reception-side system by using the DC output voltage,
wherein the power supply switch transistor enables electric conduction between the output terminal and the converter output terminal of the DC-DC converter,
wherein the current limiting circuit limits a load current of the power supply switch transistor flowing from the converter output terminal to the output terminal,
wherein the input voltage detecting circuit generates an input voltage detection signal according to detection of the level of the DC input voltage supplied to the input terminal and supplies the input voltage detection signal to the current limiting circuit,
wherein the current limiting circuit controls the value of maximum current by the current limit of the power supply switch transistor in response to the input voltage detection signal supplied from the input voltage detection circuit,
wherein in the case where the DC input voltage supplied to the input terminal is at the high level, the current limiting circuit controls the value of the maximum current by the current limit of the power supply switch transistor to large current in response to the input voltage detection signal, and
wherein in the case where the DC input voltage supplied to the input terminal is at a level lower than the high level, the current limiting circuit controls the value of maximum current by the current limit of the power supply switch transistor to a current smaller than the large current in response to the input voltage detection signal.

2. The semiconductor integrated circuit according to claim 1, wherein the power supply switch transistor is a P-channel MOS transistor whose source and drain are coupled to the converter output terminal and the output terminal, respectively.

3. The semiconductor integrated circuit according to claim 2, wherein the gate of the P-channel MOS transistor of the power supply switch transistor is controlled by the current limiting circuit.

4. The semiconductor integrated circuit according to claim 3,
wherein the current limiting circuit includes a control P-channel MOS transistor, a detection resistor, and a differential amplifier,
wherein the source and drain of the control P-channel MOS transistor are coupled to the converter output terminal and one end of the detection resistor, respectively, the other end of the detection resistor is coupled to grounding potential,
wherein a reference voltage, the input voltage detection signal, and a detection voltage of the one end of the detection resistor are supplied to a first inversion input terminal, a second inversion input terminal, and a non-inversion input terminal of the differential amplifier, respectively,
wherein the gate of the P-channel MOS transistor and a gate of the control P-channel MOS transistor are controlled by an output signal of the differential amplifier, and
wherein the differential amplifier selects a low voltage level from the reference voltage of the first inversion input terminal and the input voltage detection signal of the second inversion input terminal, and the output signal of the differential amplifier controls drain current of the control P-channel MOS transistor so that the detection voltage of a non-inversion input terminal matches the selected low voltage level.

5. The semiconductor integrated circuit according to claim 4,
wherein in the case where level of the reference voltage of the first inversion input terminal is lower than that of the input voltage detection signal of the second inversion input terminal, drain current of the control P-channel MOS transistor is controlled so that the detection voltage matches the reference voltage, and
wherein in the case where the level of the input voltage detection signal of the second inversion input terminal is lower than that of the reference voltage of the first inversion input terminal, the drain current of the control P-channel MOS transistor is controlled so that the detection voltage matches the input voltage detection signal.

6. The semiconductor integrated circuit according to claim 5,
wherein the current limiting circuit further includes an offset voltage circuit for generating first and second offset voltages, and
wherein a first sum voltage of the first offset voltage and the detection voltage is supplied to the non-inversion input terminal of the differential amplifier, and a second sum voltage of the second offset voltage and the reference voltage is supplied to the first inversion input terminal of the differential amplifier.

7. The semiconductor integrated circuit according to claim 6,
wherein the current limiting circuit further includes a voltage control circuit having a voltage comparison amplifier and a comparison control transistor,
wherein first and second input terminals of the voltage comparison amplifier are coupled to the drain of the P-channel MOS transistor of the power supply switch transistor and the drain of the control P-channel MOS transistor, respectively, and
wherein an output terminal of the voltage comparison amplifier is coupled to a control input terminal of the comparison control transistor, and an output current path of the comparison control transistor is coupled between the drain of the control P-channel MOS transistor and the one end of the detection resistor.

8. The semiconductor integrated circuit according to claim 7, wherein the input voltage detection circuit includes first and second voltage dividing resistors, wherein the DC input voltage to be supplied to the input terminal is supplied to one end of the first voltage dividing resistor, the other end of the first voltage dividing resistor is coupled to one end of the second voltage dividing resistor, and the other end of the second voltage dividing resistor is coupled to grounding potential, and wherein the input voltage detection signal is generated from a coupling node between the other end of the first voltage dividing resistor and the one end of the second voltage dividing resistor of the input voltage detection circuit.

9. The semiconductor integrated circuit according to claim 8, further comprising a low-pass filter including a resistive element and a capacitive element, wherein the input voltage detection signal generated from the input voltage detection circuit is supplied to an input terminal of the low-pass filter, and the input voltage detection signal transmitted to the output terminal of the low-pass filter is supplied to the second inversion input terminal of the current limiting circuit.

10. The semiconductor integrated circuit according to claim 9, wherein an RF signal by NFC and an RF signal by wireless power supply can be supplied in a time division manner to the input terminal.

11. The semiconductor integrated circuit according to claim 10, further comprising a linear regulator coupled in parallel to the DC-DC converter coupled between the input terminal and the output terminal, wherein the linear regulator promptly operates in response to supply of the DC input voltage of the input terminal, and wherein the DC-DC converter operates as a switching regulator having power efficiency higher than that of the linear regulator.

12. The semiconductor integrated circuit according to claim 11, wherein the input terminal is configured so that the DC input voltage can be supplied to the input terminal via a first schottky diode and an AC-DC conversion voltage of an AC power supply coupling interface can be supplied to the input terminal via a second schottky diode.

13. The semiconductor integrated circuit according to claim 12, further comprising another input terminal and a switch, wherein the another input terminal is configured so that a USB power supply voltage of a USB coupling interface can be supplied to the another input terminal, and the one end and the other end of the switch are coupled to the another input terminal and the output terminal, respectively.

14. An operation method of a semiconductor integrated circuit comprising an input terminal, a DC-DC converter, an output terminal, a power supply switch transistor, a current limiting circuit, and an input voltage detecting circuit, wherein a DC input voltage generated by rectifying and smoothing an RF reception signal can be supplied to the input terminal, wherein the DC-DC converter can generate, from a converter output terminal, a DC output voltage having a desired voltage level from the DC input voltage supplied to the input terminal, wherein the output terminal can charge an external battery or supply power to an external power-reception-side system by using the DC output voltage, wherein the power supply switch transistor enables electric conduction between the output terminal and the converter output terminal of the DC-DC converter, wherein the current limiting circuit limits a load current of the power supply switch transistor flowing from the converter output terminal to the output terminal, wherein the input voltage detecting circuit generates an input voltage detection signal according to detection of the level of the DC input voltage supplied to the input terminal and supplies the input voltage detection signal to the current limiting circuit, wherein the current limiting circuit controls the value of maximum current by the current limit of the power supply switch transistor in response to the input voltage detection signal supplied from the input voltage detection circuit, wherein in the case where the DC input voltage supplied to the input terminal is at the high level, the current limiting circuit controls the value of the maximum current by the current limit of the power supply switch transistor to large current in response to the input voltage detection signal, and wherein in the case where the DC input voltage supplied to the input terminal is at a level lower than the high level, the current limiting circuit controls the value of maximum current by the current limit of the power supply switch transistor to a current smaller than the large current in response to the input voltage detection signal.

15. The operation method of a semiconductor integrated circuit according to claim 14, wherein the power supply switch transistor is a P-channel MOS transistor whose source and drain are coupled to the converter output terminal and the output terminal, respectively.

16. The operation method of a semiconductor integrated circuit according to claim 15, wherein the gate of the P-channel MOS transistor of the power supply switch transistor is controlled by the current limiting circuit.

17. The operation method of a semiconductor integrated circuit according to claim 16, wherein the current limiting circuit includes a control P-channel MOS transistor, a detection resistor, and a differential amplifier, wherein the source and drain of the control P-channel MOS transistor are coupled to the converter output terminal and one end of the detection resistor, respectively, the other end of the detection resistor is coupled to grounding potential, wherein a reference voltage, the input voltage detection signal, and a detection voltage of the one end of the detection resistor are supplied to a first inversion input terminal, a second inversion input terminal, and a non-inversion input terminal of the differential amplifier, respectively, wherein the gate of the P-channel MOS transistor and a gate of the control P-channel MOS transistor are controlled by an output signal of the differential amplifier, and wherein the differential amplifier selects a low voltage level from the reference voltage of the first inversion input terminal and the input voltage detection signal of the second inversion input terminal, and the output signal of the differential amplifier controls drain current of the control P-channel MOS transistor so that the detection voltage of the non-inversion input terminal matches the selected low voltage level.

18. The operation method of a semiconductor integrated circuit according to claim 17, wherein in the case where level of the reference voltage of the first inversion input terminal is lower than that of the input voltage detection signal of the second inversion input terminal, drain current of the control P-channel MOS transistor is controlled so that the detection voltage matches the reference voltage, and wherein in the case where the level of the input voltage detection signal of the second inversion input terminal is lower than that of the reference voltage of the first inversion input terminal, the drain current of the control P-channel MOS transistor is controlled so that the detection voltage matches the input voltage detection signal.

19. The operation method of a semiconductor integrated circuit according to claim 18, wherein the current limiting circuit further includes an offset voltage circuit for generating first and second offset voltages, wherein a first sum voltage of the first offset voltage and the detection voltage is supplied to the non-inversion input terminal of the differential amplifier, and a second sum voltage of the second offset voltage and the reference voltage is supplied to the first inversion input terminal of the differential amplifier.

20. The operation method of a semiconductor integrated circuit according to claim 19, wherein the current limiting circuit further includes a voltage control circuit having a voltage comparison amplifier and a comparison control transistor, wherein first and second input terminals of the voltage comparison amplifier are coupled to the drain of the P-channel MOS transistor of the power supply switch transistor and the drain of the control P-channel MOS transistor, respectively, and wherein an output terminal of the voltage comparison amplifier is coupled to a control input terminal of the comparison control transistor, and an output current path of the comparison control transistor is coupled between the drain of the control P-channel MOS transistor and the one end of the detection resistor.

* * * * *